US012654684B2

(12) United States Patent

Momiyama et al.

(10) Patent No.: US 12,654,684 B2

(45) Date of Patent: Jun. 16, 2026

(54) AUTOMATED DRIVING METHOD PERFORMED BY ARTICULATED VEHICLE

(71) Applicant: Advanced Smart Mobility CO., LTD., Tsukuba (JP)

(72) Inventors: Fujio Momiyama, Tsukuba (JP); Yusuke Kasai, Tsukuba (JP); Fuminori Soma, Tsukuba (JP); Yasuo Yoshinaga, Tsukuba (JP); Yoshinori Hazaka, Tsukuba (JP); Kunihiro Fuwa, Osaka (JP); Yuuki Matsumoto, Osaka (JP); Sou Kondo, Osaka (JP); Kenji Watanabe, Tokyo (JP); Yosuke Kashiwada, Tokyo (JP); Chiaki Takao, Tokyo (JP)

(73) Assignee: ADVANCED SMART MOBILITY CO., LTD., Tsukuba (JP)

( * ) Notice: Subject to any disclaimer, the term of this patent is extended or adjusted under 35 U.S.C. 154(b) by 28 days.

(21) Appl. No.: 18/868,150

(22) PCT Filed: May 29, 2023

(86) PCT No.: PCT/JP2023/019981

§ 371 (c)(1),
(2) Date: Nov. 21, 2024

(87) PCT Pub. No.: WO2023/234271

PCT Pub. Date: Dec. 7, 2023

(65) Prior Publication Data

US 2025/0276683 A1 Sep. 4, 2025

(30) Foreign Application Priority Data

May 31, 2022 (JP) ................................. 2022-088186
Oct. 3, 2022 (JP) ................................. 2022-159300

(51) Int. Cl.
B60W 30/04 (2006.01)
B60W 10/20 (2006.01)
(Continued)

(52) U.S. Cl.
CPC .......... B60W 30/045 (2013.01); B60W 10/20 (2013.01); B60W 30/10 (2013.01);
(Continued)

(58) Field of Classification Search
CPC .... B60W 30/045; B60W 10/20; B60W 30/10; B60W 60/001; B60W 2300/10;
(Continued)

(56) References Cited

U.S. PATENT DOCUMENTS 12,384,459 B2 * 8/2025 Fröjd ................... B62D 13/005
2017/0320488 A1 * 11/2017 Alm ..................... B60W 20/15
(Continued)

FOREIGN PATENT DOCUMENTS

CN 110550023 A 12/2019
JP 2001310651 11/2001
(Continued)

OTHER PUBLICATIONS

International Search Report issued in connection with PCT/JP2023/019981.
Written Opinion issued in connection with PCT/JP2023/019981.

*Primary Examiner* — Sizo B Vilakazi
(74) *Attorney, Agent, or Firm* — United IP Counselors, LLC

(57) ABSTRACT

Provided is an autonomous driving system that satisfies setting of a driving path shared in common by an articulated bus and a single bus applicable to a bus rapid transit system that allows both an articulated bus and a single bus to travel on the same track in common. A trajectory of a rearmost axle forms a path in path setting irrespective a single vehicle and (Continued)

An explanatory view illustrating a difference between a rail way trajectory and an automobile trajectory Front and rear wheels run on the same trajectory Front and rear wheels do not run on the same trajectory Outer wheel track difference Inner wheel track difference Trajectory of railway Trajectory of automobile an articulated vehicle thus enabling the articulated vehicles having different data and sizes and a vehicle weight changes due to riding on or getting off of passengers from a bus can also trace the path. The system includes sensors that detect a change in its own weight, a change in the position of the center of gravity, and a change in axle weights. The system satisfies requested acceleration by detecting a dynamic performance together with the change in its own weight and a change in a gradient of a road. The system satisfies the conditions necessary for a safe control in longitudinal and lateral motions in conformity with wetness of a road surface.

1 Claim, 14 Drawing Sheets

(51) Int. Cl.
| | |
|---|---|
| *B60W 30/045* | (2012.01) |
| *B60W 30/10* | (2006.01) |
| *B60W 60/00* | (2020.01) |

(52) U.S. Cl.
CPC ....... *B60W 60/001* (2020.02); *B60W 2300/10* (2013.01); *B60W 2520/22* (2013.01); *B60W 2540/18* (2013.01); *B60W 2552/30* (2020.02)

(58) Field of Classification Search
CPC ......... B60W 2520/22; B60W 2540/18; B60W 2552/30; B62D 12/02; B62D 13/00; B62D 15/025
See application file for complete search history.

(56) References Cited

U.S. PATENT DOCUMENTS

| | | | | |
|---|---|---|---|---|
| 2019/0351895 | A1* | 11/2019 | Ben-Ari | .................... B60K 6/26 |
| 2025/0276680 | A1* | 9/2025 | Hultén | ................ B60W 10/184 |

FOREIGN PATENT DOCUMENTS

| | | |
|---|---|---|
| JP | 5981010 | 8/2016 |
| JP | 2017065454 A | 4/2017 |
| JP | 6202700 B1 | 9/2017 |
| JP | 6243079 B1 | 12/2017 |
| JP | 2019156066 A | 9/2019 |

* cited by examiner

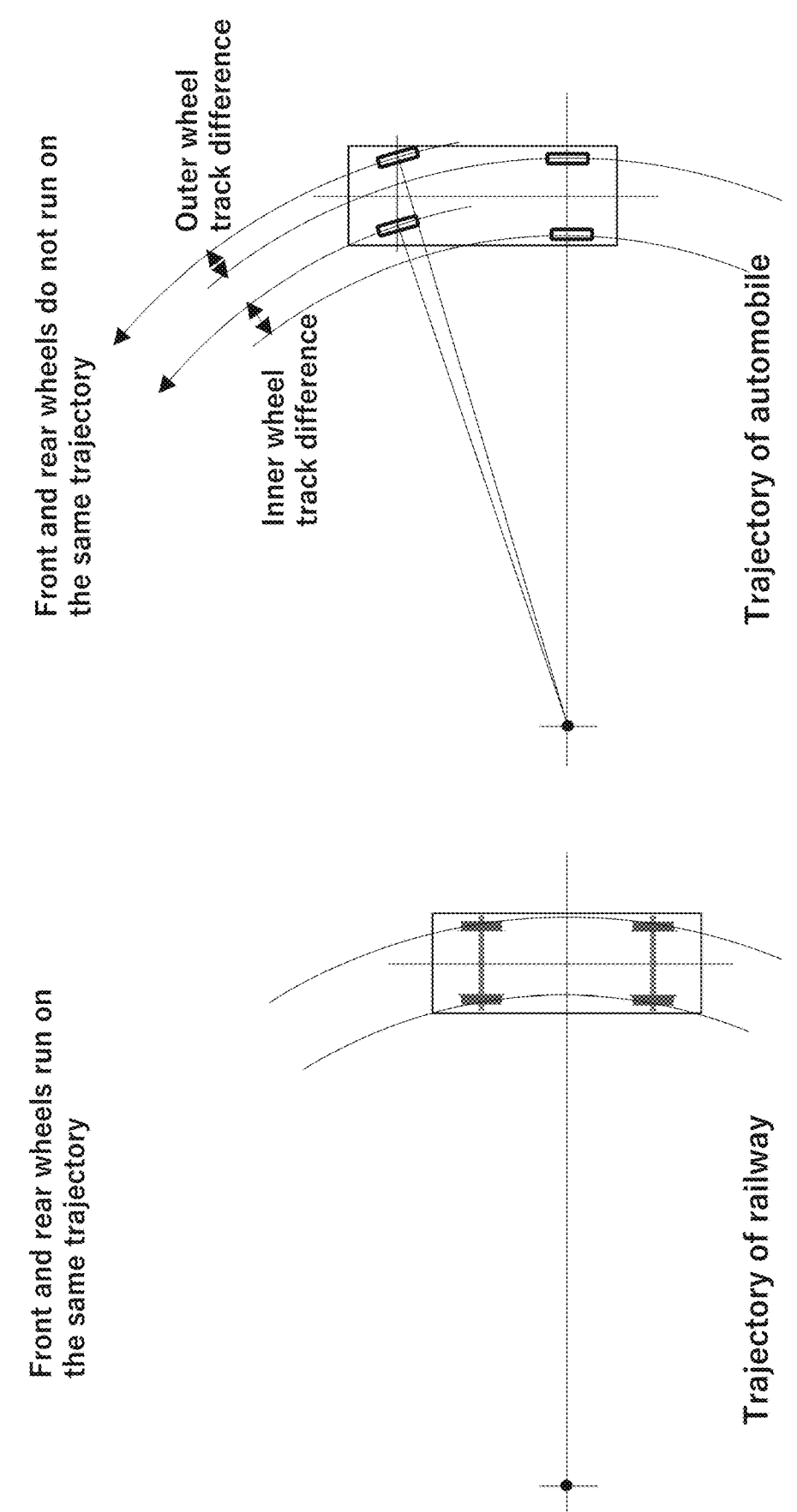
[ Fig.1 ] An explanatory view illustrating a difference between a rail way trajectory and an automobile trajectory
Front and rear wheels do not run on the same trajectory
Outer wheel track difference
Inner wheel track difference
Trajectory of automobile
Front and rear wheels run on the same trajectory
Trajectory of railway

[Fig.2] An explanatory view illustrating a rear axle of single vehicle and a rearmost axle of articulated vehicle share the same trajectory
The trajectories of the rear axle center and the most rear axle center are possible to use as the seared route for them.
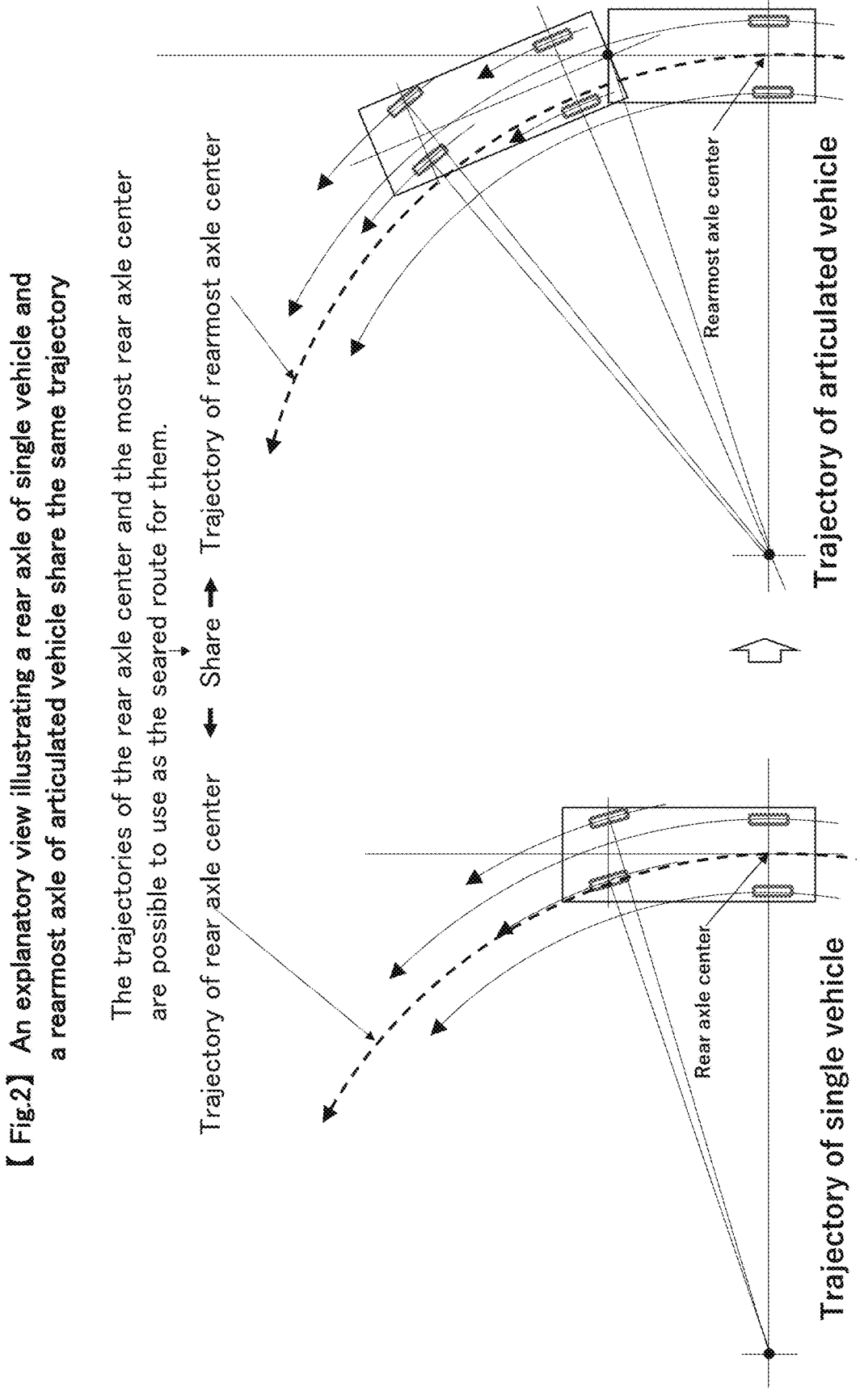

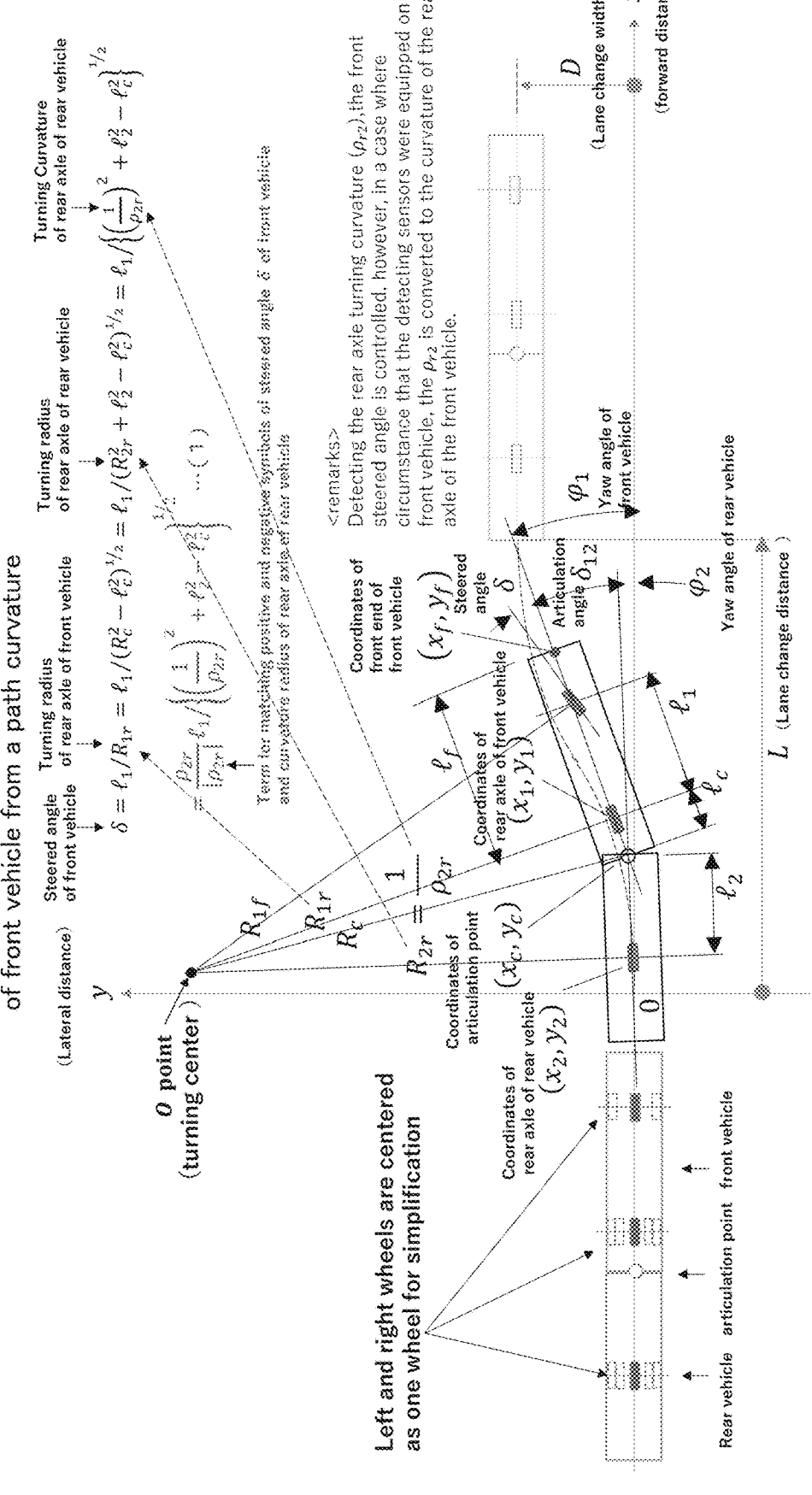
[Fig.3] An explanatory view of a formula for calculating a steered angle of front vehicle from a path curvature

[Fig.4] An explanatory view of a control formula where a "stability factor" is obtained by an experiment and "the formula for calculating the steered angle of a front wheel from a path curvature" is multiplied by the stability factor.
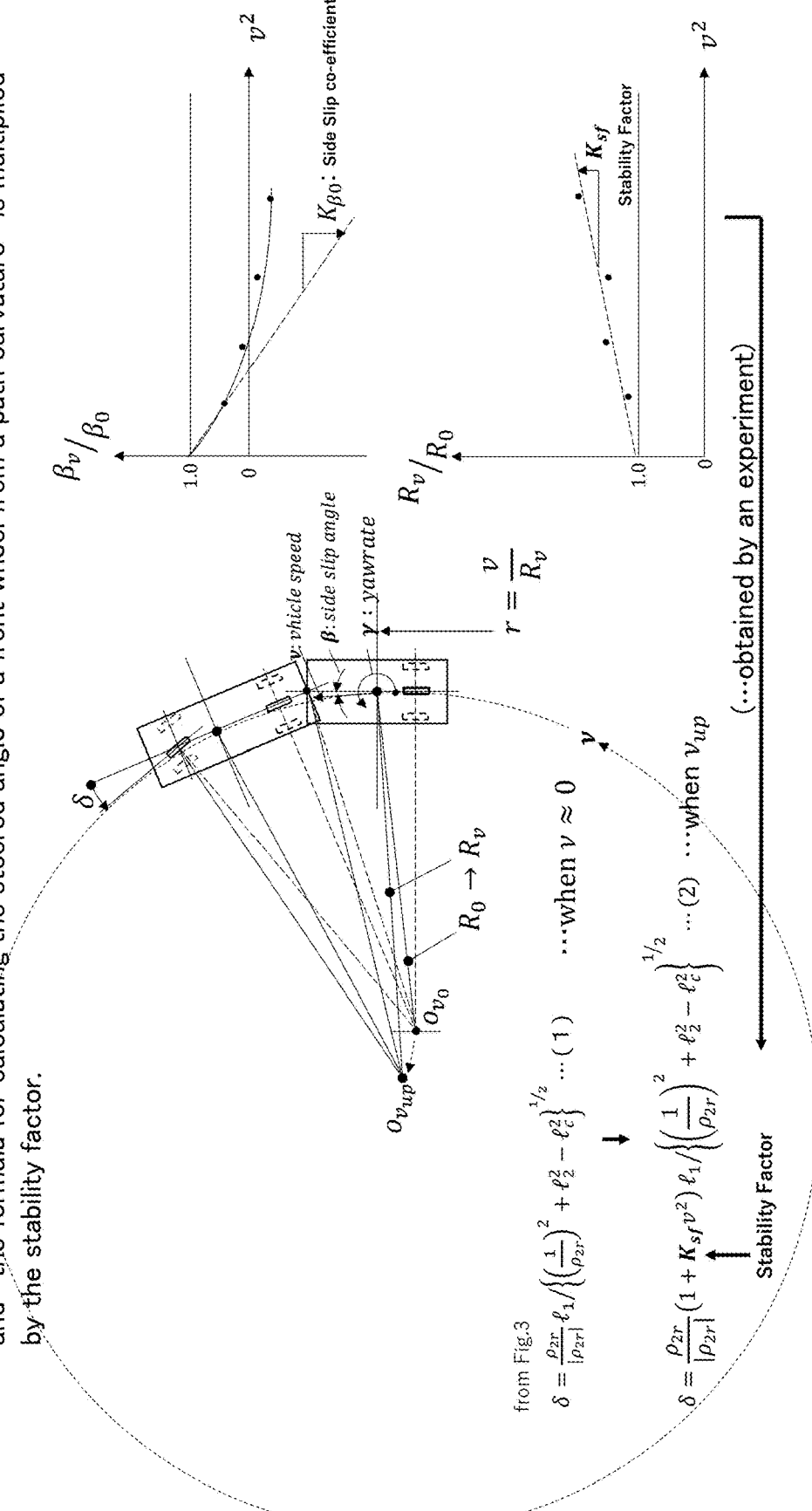

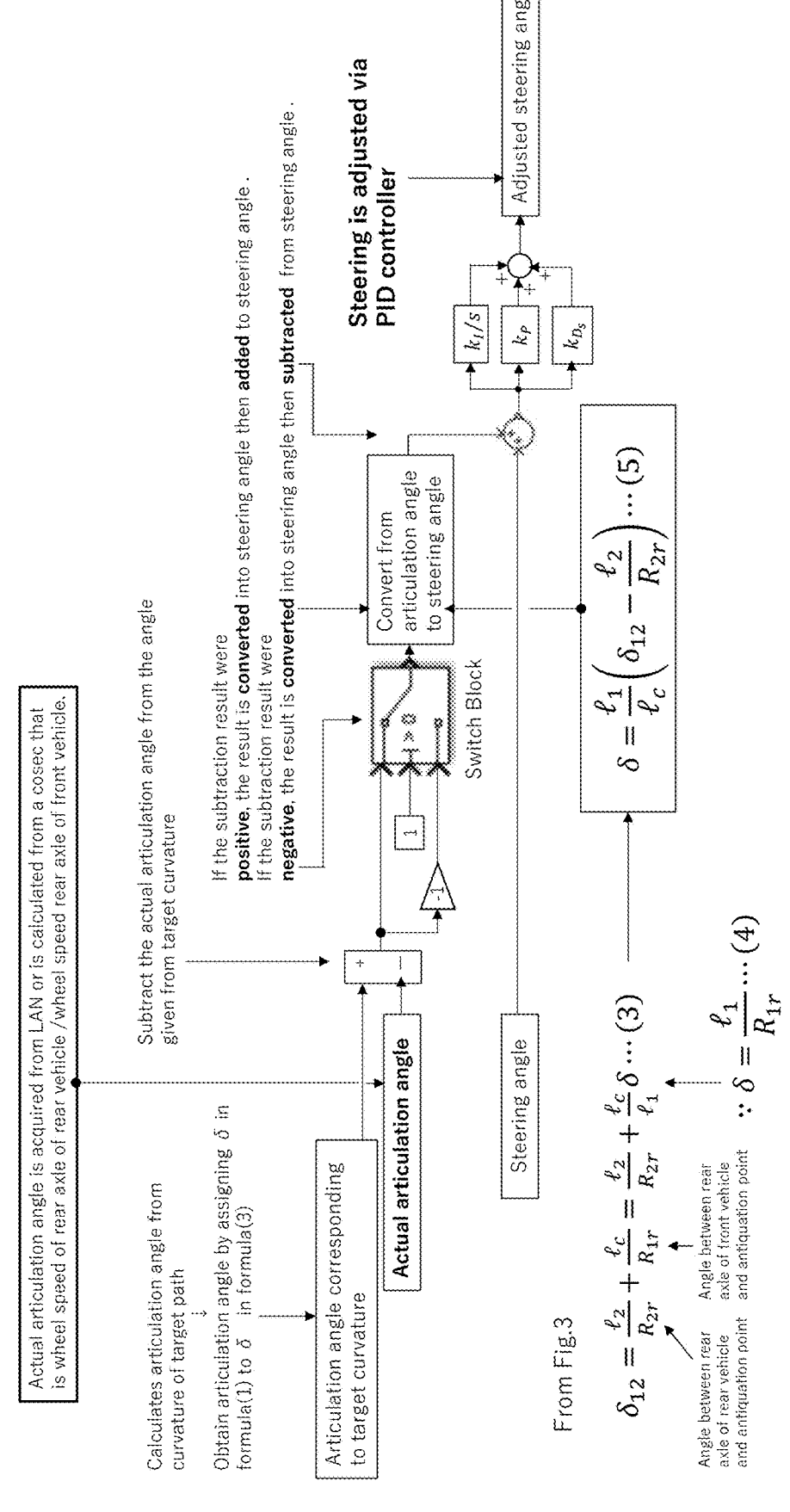
[Fig.5] An explanatory view of the control method into which a check helm is added.

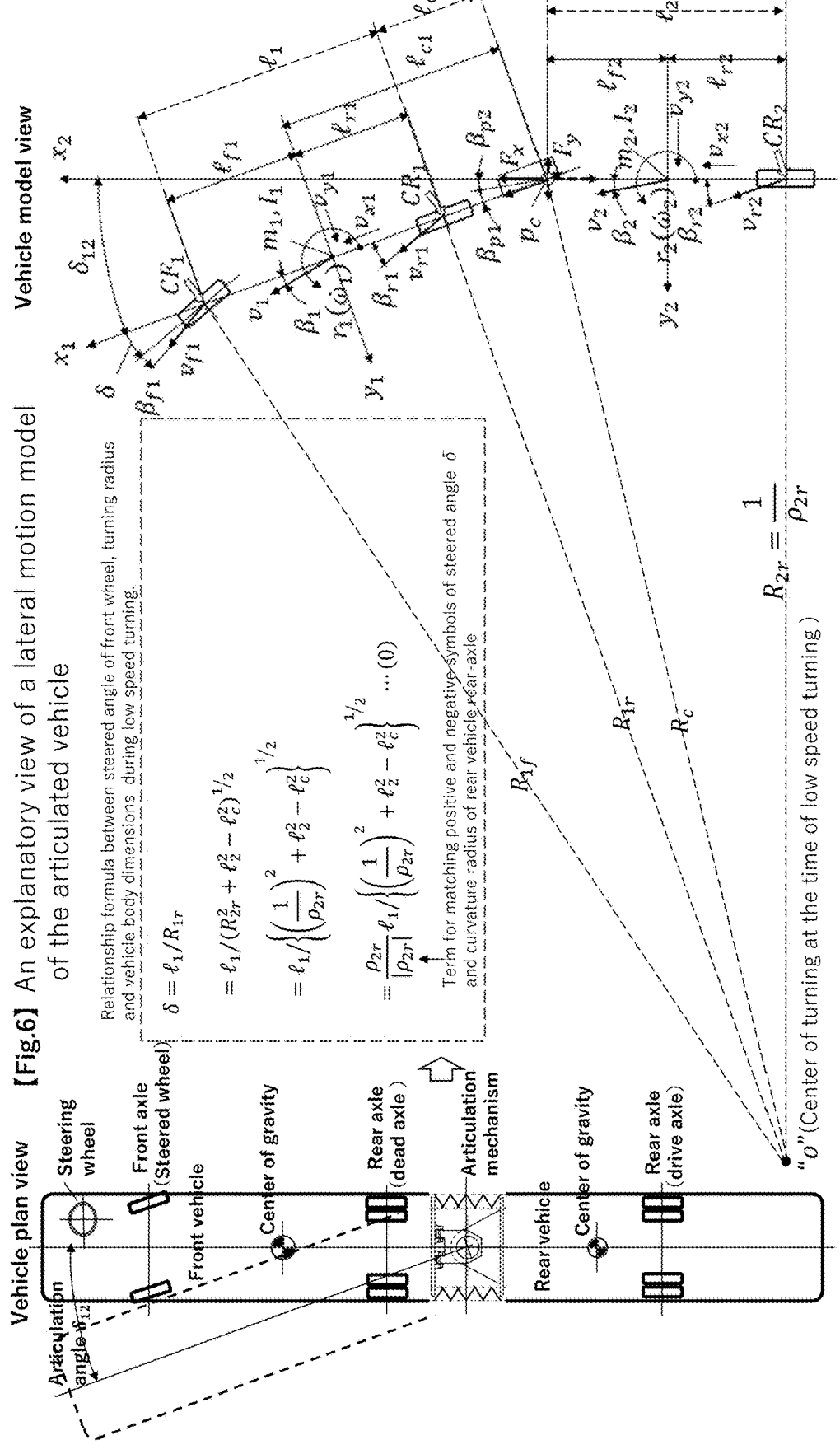

[Fig.6] An explanatory view of a lateral motion model of the articulated vehicle Relationship formula between steered angle of front wheel, turning radius and vehicle body dimensions during low speed turning.

$$\delta = \ell_1 / R_{1r}$$

$$\equiv \ell_1 / (R_{2r}^2 + \ell_2^2 - \ell_c^2)^{1/2}$$

$$\equiv \ell_1 / \left\{ \left( \frac{1}{\rho_{2r}} \right)^2 + \ell_2^2 - \ell_c^2 \right\}^{1/2}$$

$$\equiv \frac{\rho_{2r}}{|\rho_{2r}|} \ell_1 / \left\{ \left( \frac{1}{\rho_{2r}} \right)^2 + \ell_2^2 - \ell_c^2 \right\}^{1/2} \quad \cdots (0)$$

Term for matching positive and negative Symbols of steered angle $\delta$ and curvature radius of rear vehicle rear-axle $$R_{2r} = \frac{1}{\rho_{2r}}$$

"O" (Center of turning at the time of low speed turning)

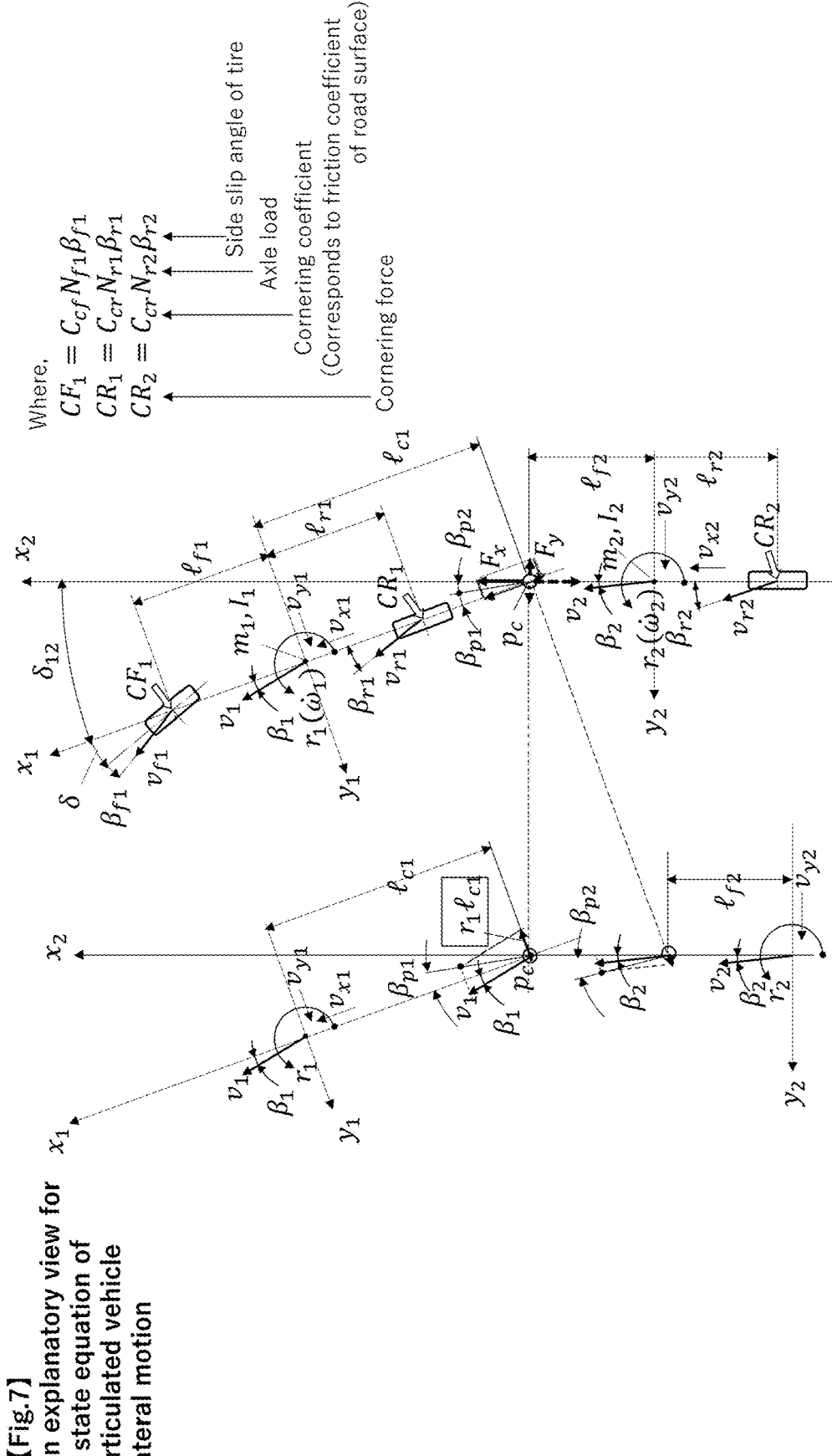
[Fig.7]
An explanatory view for
a state equation of
articulated vehicle
lateral motion

[Fig.8] An explanatory view of an identification experiment of the lateral motion of articulated vehicle
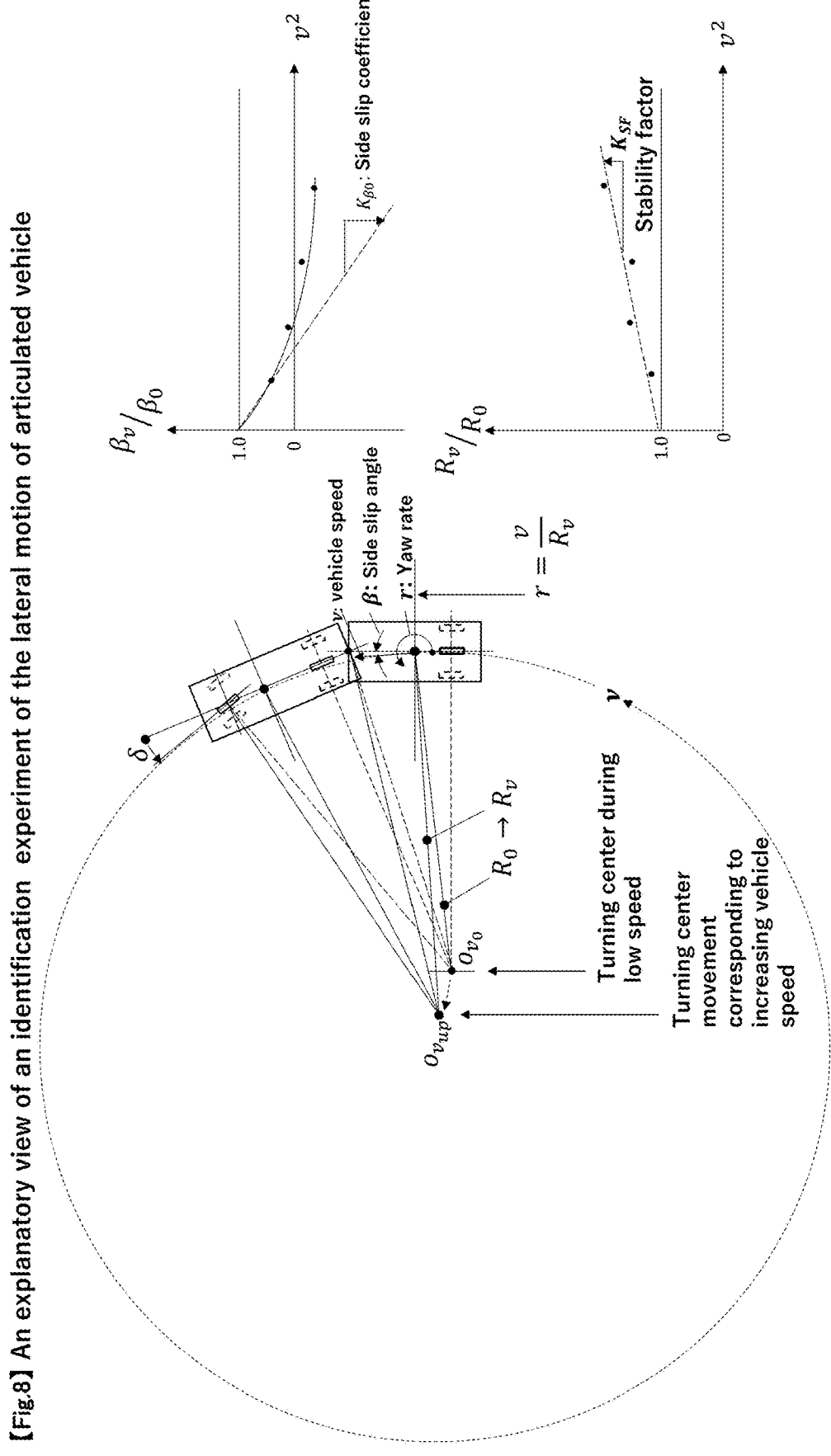

[Fig.9] An explanatory view of mounted sensors that detect gross vehicle weight, vehicle gravity center location and axle loads
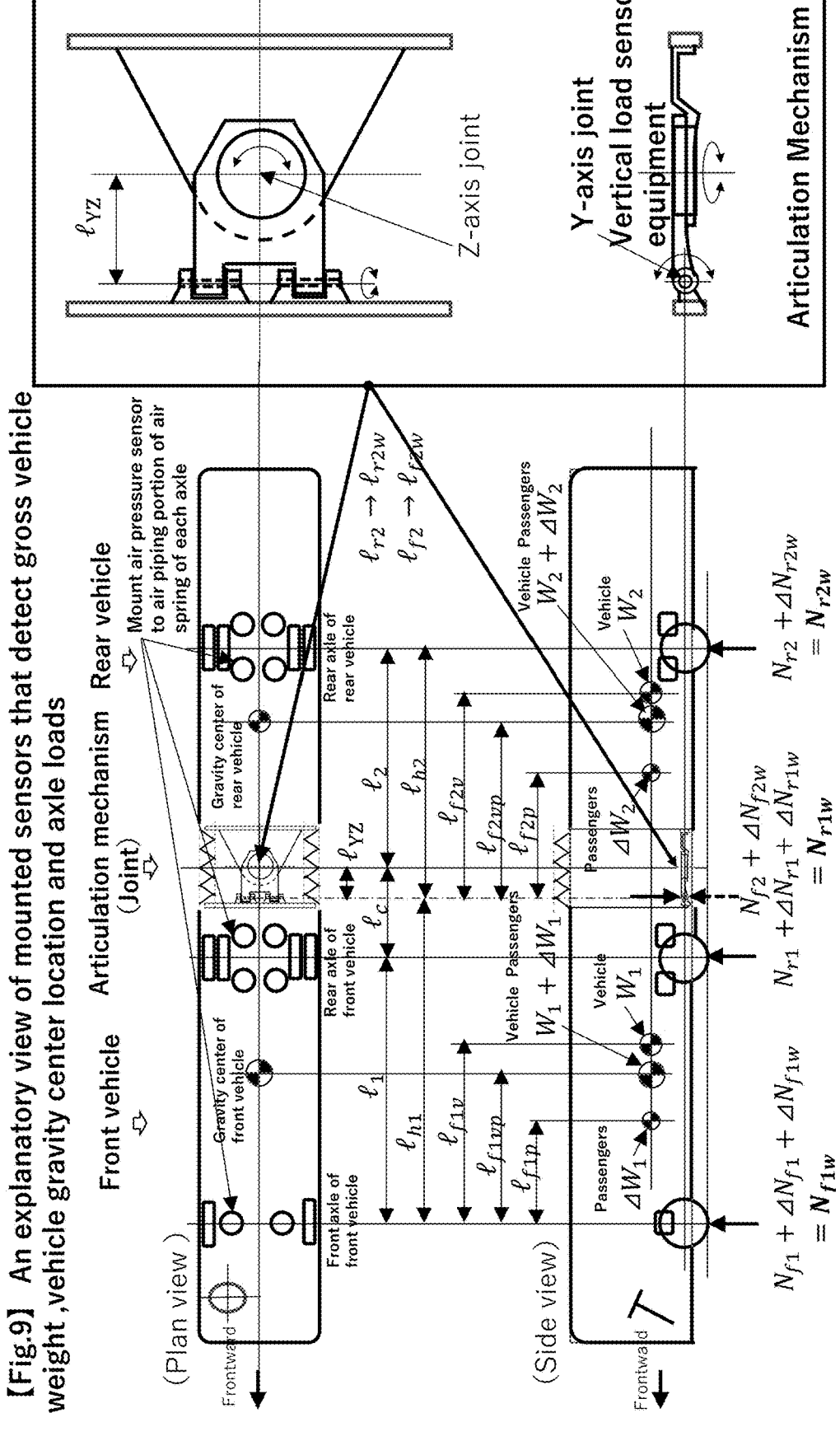

[Fig.10] An explanatory view of a detection flow of detecting changes in gross vehicle weight, gravity centerlocation and axle loads

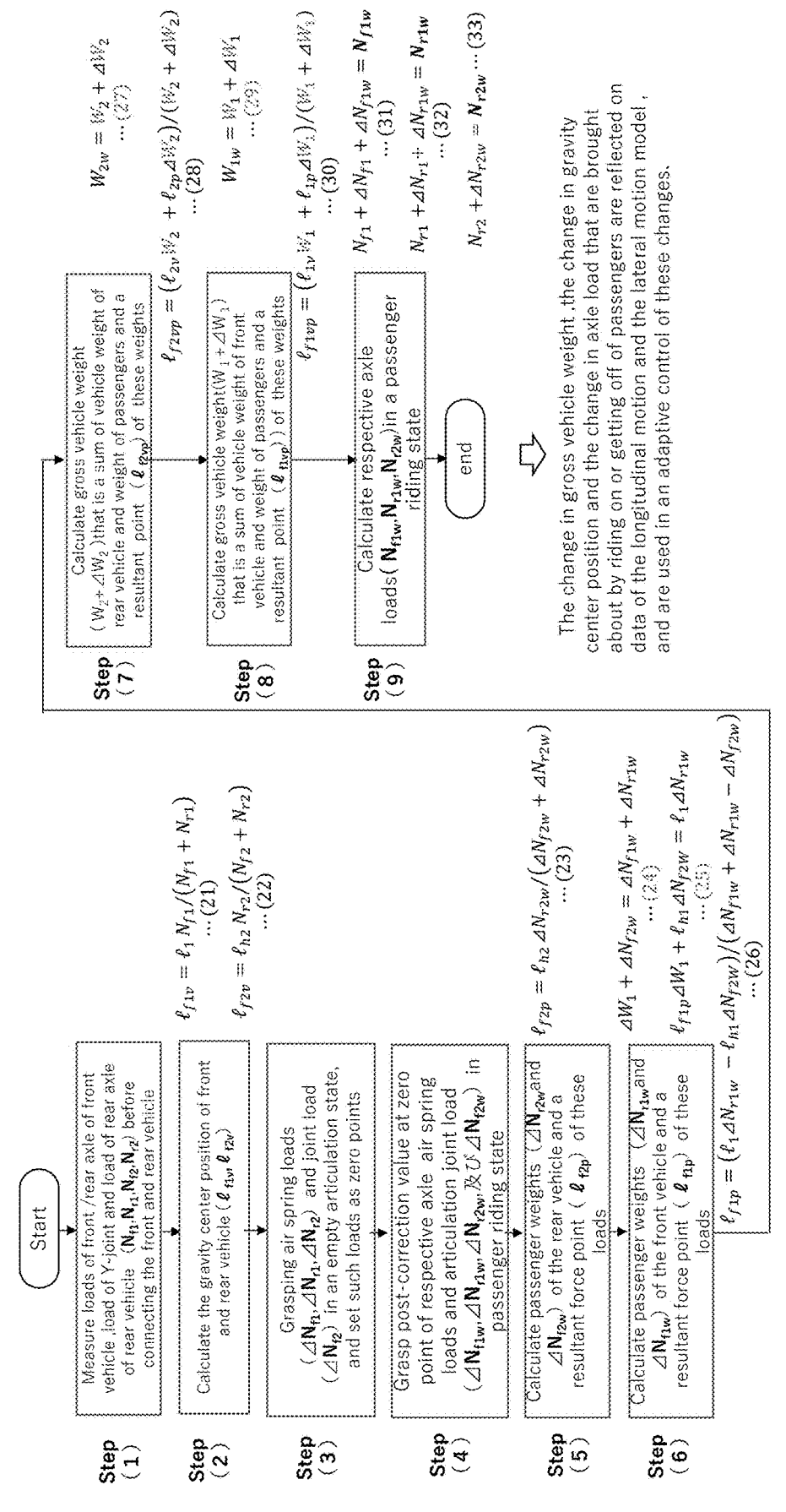

Step (1) Measure loads of front/rear axle of front vehicle, load of Y-joint and load of rear axle of rear vehicle $(N_{f1}, N_{r1}, N_{2}, N_{f2}, N_{r2})$ before connecting the front and rear vehicle

Step (2) Calculate the gravity center position of front and rear vehicle ($\ell_{f1v}, \ell_{f2v}$)

Step (3) Grasping air spring loads ($\Delta N_{f1}, \Delta N_{r1}, \Delta N_{r2}$) and joint load ($\Delta N_{f2}$) in an empty articulation state, and set such loads as zero points

Step (4) Grasp post-correction value at zero point of respective axle air spring loads and articulation joint load ($\Delta N_{f1w}, \Delta N_{r1w}, \Delta N_{r2w}, \Delta N_{f2w}$ 及び $\Delta N_{f2w}$) in passenger riding state

Step (5) Calculate passenger weights ($\Delta N_{r2w}$ and $\Delta N_{f2w}$) of the rear vehicle and a resultant force point ($\ell_{f2p}$) of these loads

Step (6) Calculate passenger weights ($\Delta N_{f1w}$ and $\Delta N_{r1w}$) of the front vehicle and a resultant force point ($\ell_{f1p}$) of these loads $$\ell_{f1v} = \ell_1 N_{f1}/(N_{f1} + N_{r1}) \quad \cdots (21)$$

$$\ell_{f2v} = \ell_{h2} N_{r2}/(N_{f2} + N_{r2}) \quad \cdots (22)$$

$$\ell_{f2p} = \ell_{h2}\, \Delta N_{r2w}/(\Delta N_{f2w} + \Delta N_{r2w}) \quad \cdots (23)$$

$$\Delta W_1 + \Delta N_{f2w} = \Delta N_{f1w} + \Delta N_{r1w} \quad \cdots (24)$$

$$\ell_{f1p} \Delta W_1 + \ell_{h1} \Delta N_{f2w} = \ell_1 \Delta N_{r1w} \quad \cdots (25)$$

$$\ell_{f1p} = (\ell_1 \Delta N_{r1w} - \ell_{h1} \Delta N_{f2w})/(\Delta N_{f1w} + \Delta N_{r1w} - \Delta N_{f2w}) \quad \cdots (26)$$

Step (7) Calculate gross vehicle weight ($W_2 + \Delta W_2$) that is a sum of vehicle weight of rear vehicle and weight of passengers and a resultant point ($\ell_{f2vp}$) of these weights

Step (8) Calculate gross vehicle weight($W_1 + \Delta W_1$) that is a sum of vehicle weight of front vehicle and weight of passengers and a resultant point ($\ell_{f1vp}$) of these weights

Step (9) Calculate respective axle loads($N_{f1w}, N_{r1w}, N_{r2w}$)in a passenger riding state $$W_{2w} = W_2 + \Delta W_2 \quad \cdots (27)$$

$$\ell_{f2vp} = (\ell_{2v} W_2 + \ell_{2p} \Delta W_2)/(W_2 + \Delta W_2) \quad \cdots (28)$$

$$W_{1w} = W_1 + \Delta W_1 \quad \cdots (29)$$

$$\ell_{f1vp} = (\ell_{1v} W_1 + \ell_{1p} \Delta W_1)/(W_1 + \Delta W_1) \quad \cdots (30)$$

$$N_{f1} + \Delta N_{f1} + \Delta N_{f1w} = N_{f1w} \quad \cdots (31)$$

$$N_{r1} + \Delta N_{r1} + \Delta N_{r1w} = N_{r1w} \quad \cdots (32)$$

$$N_{r2} + \Delta N_{r2w} = N_{r2w} \quad \cdots (33)$$

end

The change in gross vehicle weight, the change in gravity center position and the change in axle load that are brought about by riding on or getting off of passengers are reflected on data of the longitudinal motion and the lateral motion model, and are used in an adaptive control of these changes.

[Fig.11]An explanatory view of a traveling performance curve and an acceleration formula expressed in terms of acceleration
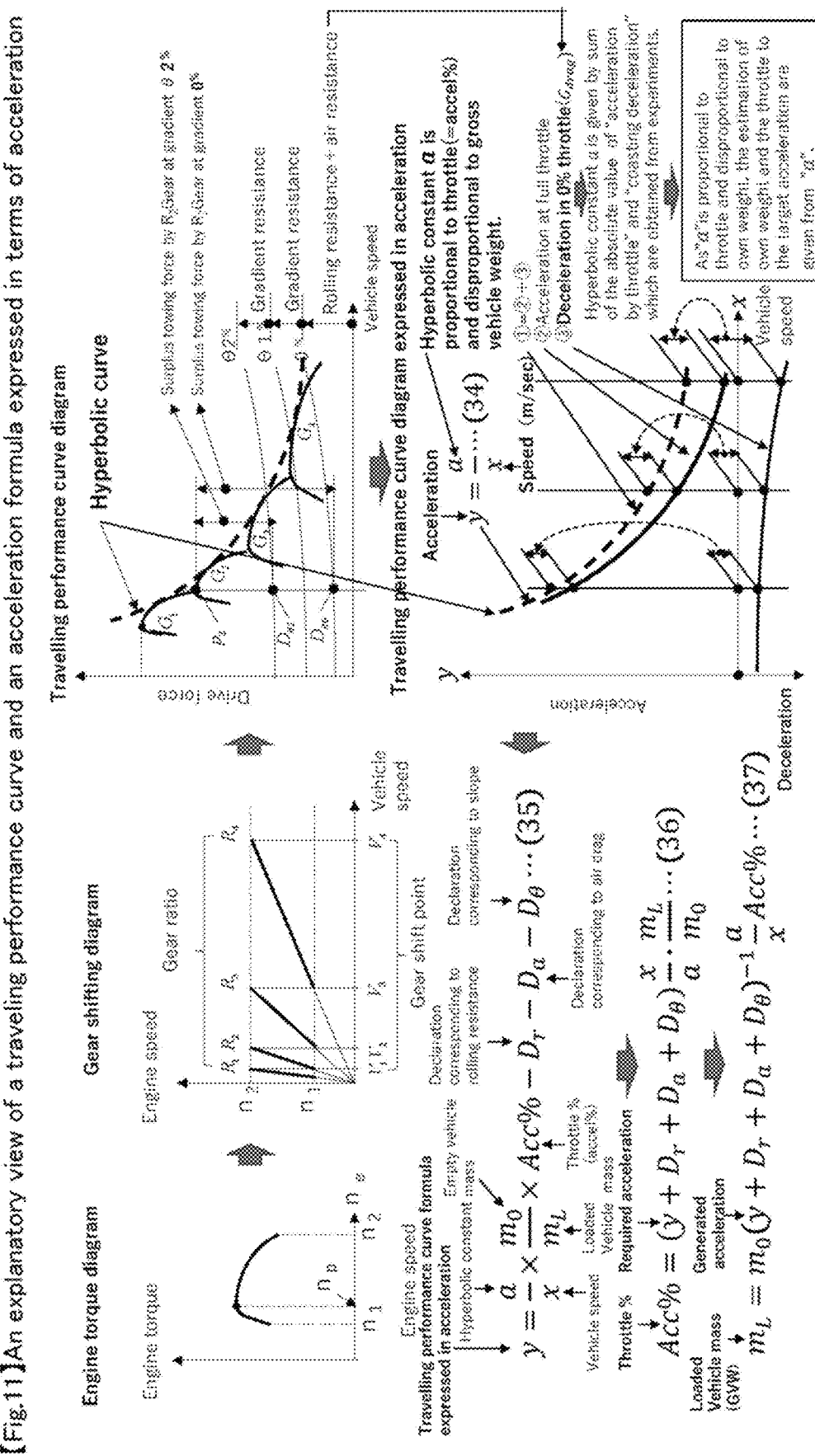

[Fig.12] An explanatory view of estimation of a gradient

Reading value of accelerometer in a standing-still state (or constant speed or constant gradient) takes a value multiplying the slope gradient to the gravity acceleration(9.81m/s²).

$$G_{x(static)} = -9.81 \times \sin\theta \cdots (38)$$

Reading value of accelerometer in a travelling state takes a value superposing the wheel rotational acceleration to the above equation(38).

$$G_{x(run)} = G_{wheel} + G_{static} = 2\pi r\dot{\omega} - 9.81 \times \sin\theta \cdots (39)$$

A slope gradient is expressed by formula(40) being derived from formula (38) and formula(39).

$$\theta = \sin^{-1}\frac{2\pi r\dot{\omega} - G_{x(run)}}{9.81} \cdots (40)$$

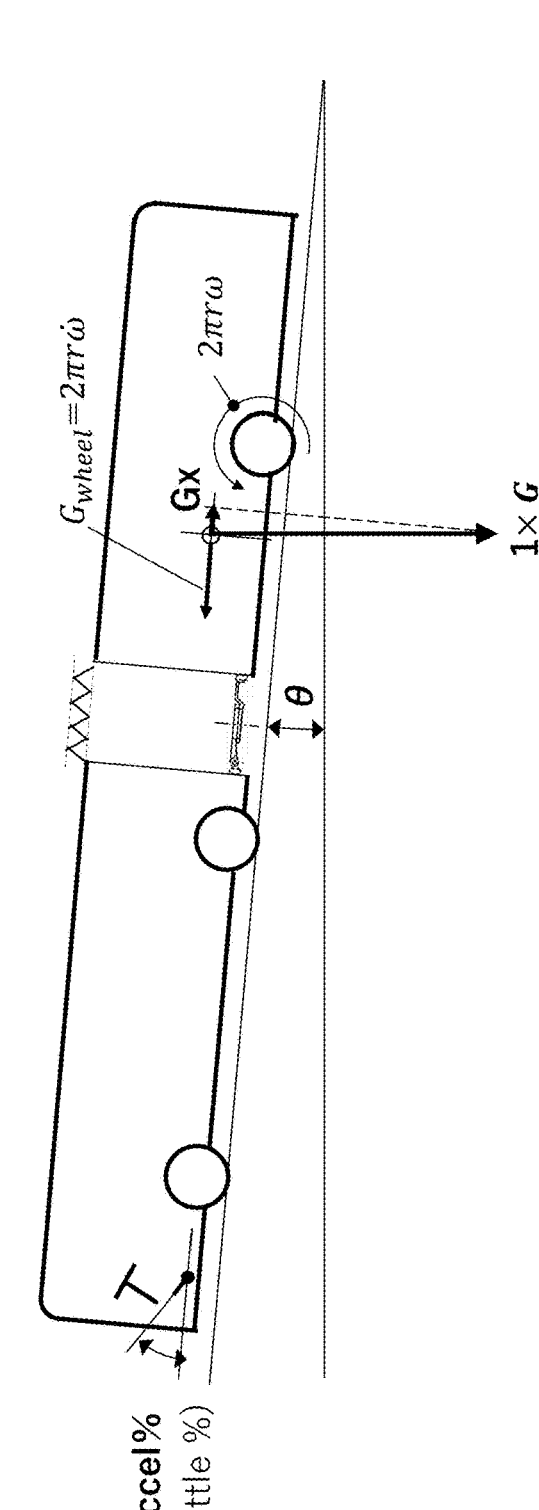

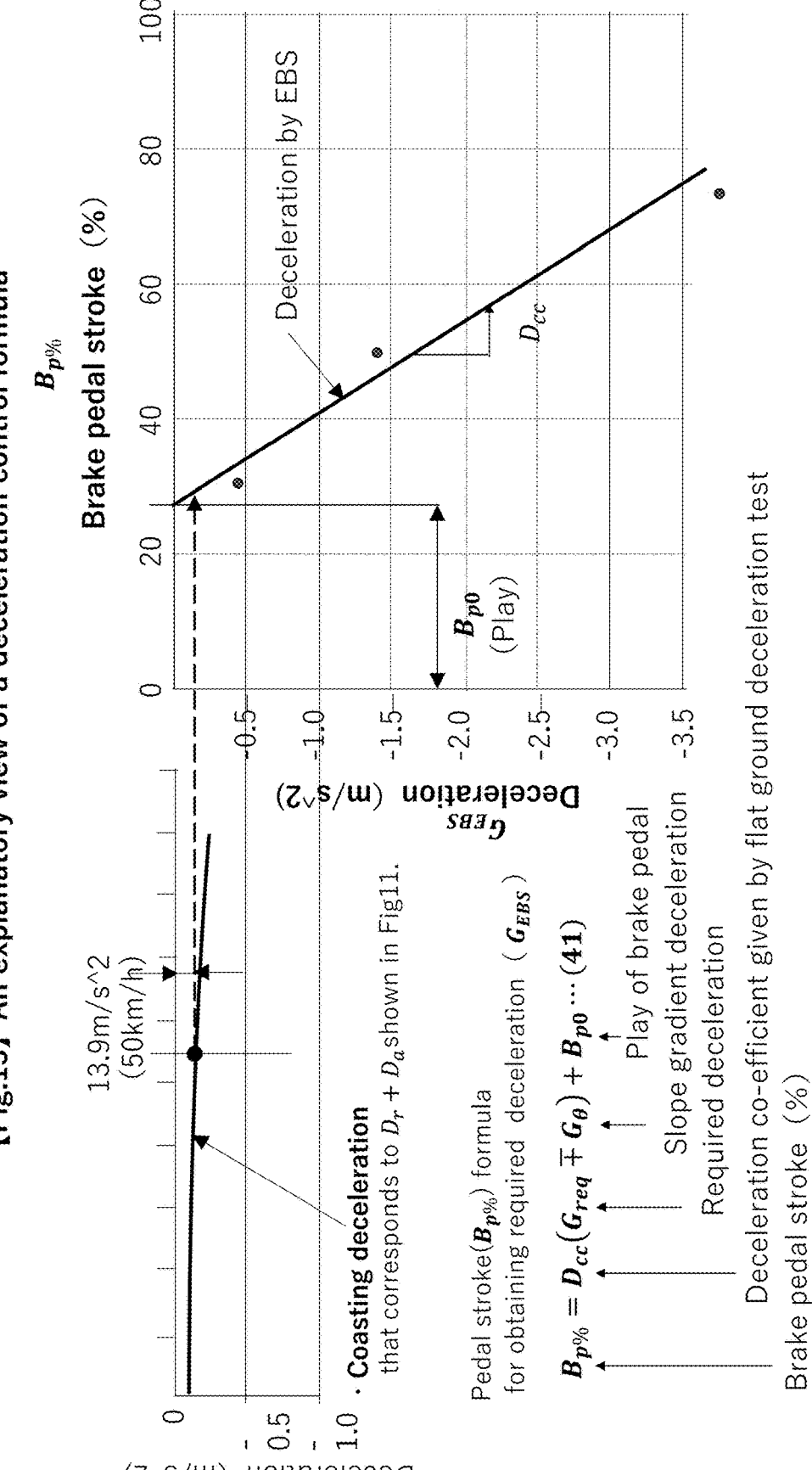
[Fig.13] An explanatory view of a deceleration control formula

Figure 14:
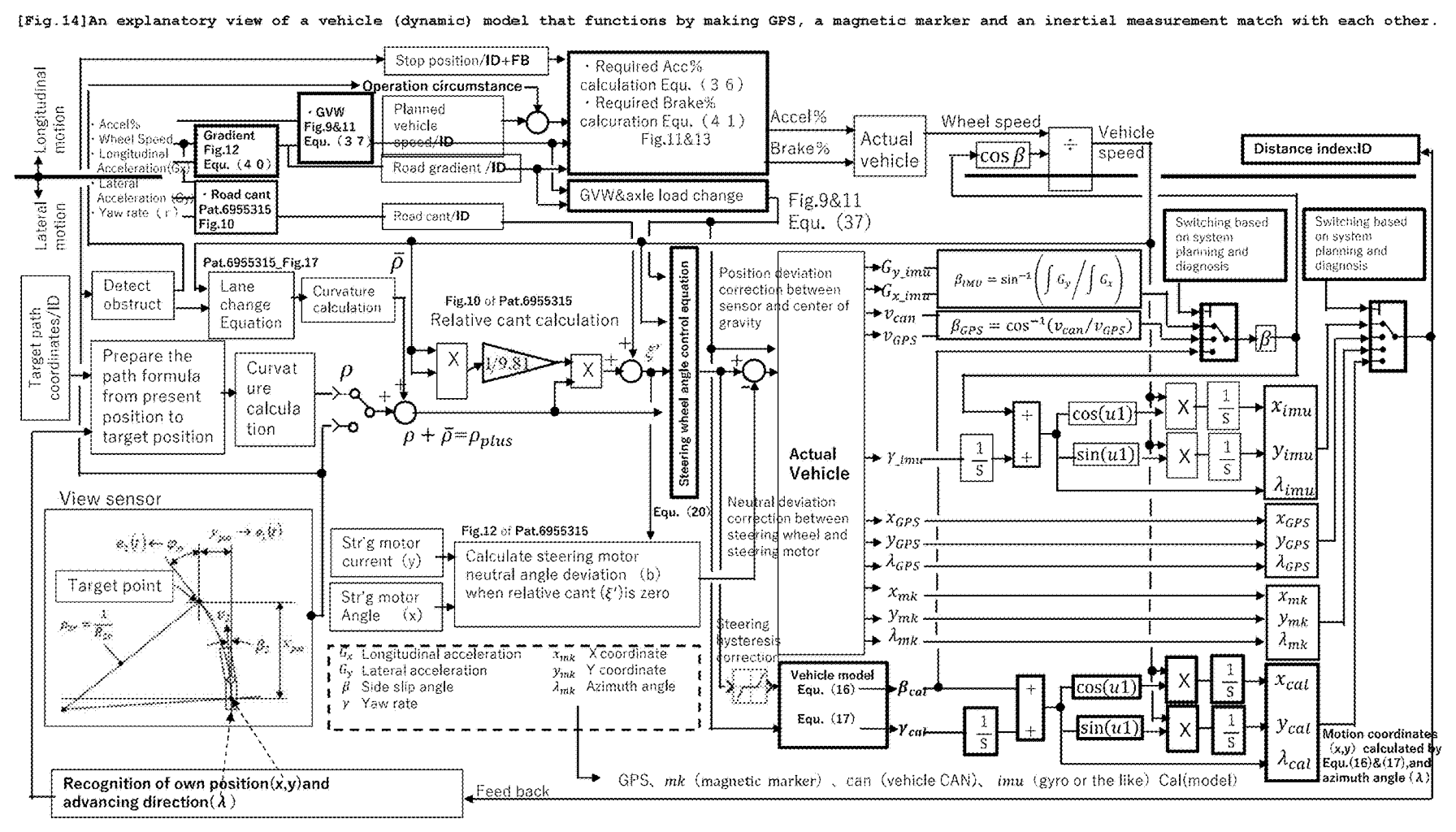

[Fig.14]An explanatory view of a vehicle (dynamic) model that functions by making GPS, a magnetic marker and an inertial measurement match with each other.

AUTOMATED DRIVING METHOD PERFORMED BY ARTICULATED VEHICLE

TECHNICAL FIELD

The present invention relates to control of an autonomous driving articulated vehicle served for a bus rapid transit (BRT) system that travels on a scheduled path.

BACKGROUND ART

A system that enables a large amount of transportation comparable to a railway by a bus that travels on a dedicated road is referred to as a bus rapid transit (BRT) system. The railway vehicle is constituted by connecting a plurality of vehicles, and travels on the same track rail without requiring steering of the person. In the bus rapid transit system, an articulated bus or a single bus travels on a road surface having no rails "in such a manner that a person steers driving". The present invention relates to a system where driving is performed in a state where "such driving by a person" is replaced with "autonomous driving", and an articulated buses and a single bus are provided in mixture, the accelerations or the decelerations of these buses are set equal, and an inter-vehicular distance between the buses is reduced.

In the above-mentioned system, the articulated bus is a bus of the two-vehicle formation having an articulated mechanism between a front-side vehicle and a rear-side vehicle, and the rear-side vehicle on which an engine (a collective term for power sources such as a gasoline engine, a diesel engine, a hydrogen engine, a hybrid engine, and an electric motor) is mounted advances while pushing the front-side vehicle on which an engine is not mounted. The front-side vehicle is pushed from a rear side and hence, it is necessary to perform an advancing path control by suppressing an articulation angle that is liable to be increased by being pushed from the rear side. In this respect, the articulated bus differs from a towing vehicle where a front vehicle (a tractor) tows a rear vehicle (tailer) so that a relative angle between the front and rear vehicles is liable to be decreased.

It is not easy for the articulated bus to travel while "drawing the same trajectory" on a road surface having no rails by driving of a person in the same manner as the railway where a train travels on rails, and to stop alongside (to lay alongside or to arrive accurately at) a platform or a curb at a station or a bus stop.

Particularly, with respect to the articulated vehicle that advances in a state where the rear vehicle pushes the front vehicle, an operation technique for making the articulated bus trace a path while suppressing the increase of the angle of an articulation angle generated by the pushing force (drive force) and a driving technique that makes the articulated vehicle trace a lane while "estimating a trajectory of the rear vehicle" that does not trace the same trajectory as the articulated front vehicle and stopes at an appropriate position are required.

In the "drawing the same trajectory" autonomous driving, "a relationship formula between a curvature of a path and a steering angle" is necessary. In the "predicting the trajectory of a rear vehicle" autonomous driving, "a relationship formula between the articulation angle between the rear vehicle and the front wheel and a steering angle" becomes necessary.

Patent literature 1 illustrates bus appropriate stop trajectories of a case of a single vehicle and a case of articulated vehicle in FIG. 1. In both cases of the single vehicle and the articulated vehicle, the patent literature 1 describes that "the trajectory of the rearmost axle becomes the basis of the movement of the entire vehicle". However, in FIG. 4, "a method of calculating a handle angle at which a vehicle traces a trajectory that the rear axle draws is described by taking only the single vehicle, and such a method is not described with respect to the articulated vehicle.

Patent literature 2 discloses a driving support system and a driving support method where a camera that acquires an image of a travelling lane is disposed on a front portion of articulated vehicle, and steering and a speed control of a front wheel of the front vehicle are supported by reading a path and a recommendable speed from the image of the travelling lane. However, such a travelling lane is "a path that the front wheel of the front vehicle traces" and hence, patent literature 2 is silent with respect to the technical feature disclosed in literature 1 that "the trajectory of the rearmost axle becomes the basis of the movement of the entire vehicle in both a single vehicle and an articulated vehicle". Accordingly, the driving on this path is limited to driving of the articulated vehicle having the same specification. Accordingly, driving of the vehicles having the different specification cannot be performed by the driving support system or the driving support method disclosed in patent literature 2.

A bus stops alongside a platform or a curb of a station or a bus stop. When a vehicular entrance is opened and passengers get on or off the bus, the vehicular entrance is closed and the bus starts. A total vehicle weight and a position of the center of gravity of the bus change along with getting on and off of the passengers during such periods. Accordingly, an acceleration characteristic (a power performance), a deceleration characteristic (a braking performance), a steering performance (a lateral movement performance) at the time of starting the vehicle differs from the corresponding characteristics or performances at the time of arrival. The acceleration characteristic is affected by a change in a total vehicle weight and a gradient of a road and hence, an adaptive control that performs a control by estimating or detecting such a change is required. The deceleration characteristic is, in the same manner as the acceleration characteristic, also affected by a change in a total vehicle weight and a gradient of a road. In this case, however, an electronic control braking system (EBS) that the system includes copes with such a change. The steering characteristic is affected by, in addition to a change in a total vehicle weight, a change in the position of the center of gravity and a change in a friction of a road surface (cornering factors of respective axles) and hence, an adaptive control that performs a control by estimating or detecting such changes is required.

Patent literature 3 describes a method of estimating a vehicle total weight and axle weights in FIG. 6. In the method, a gear ratio is determined based on a vehicle speed and an engine rotational speed, an empty vehicle acceleration at a peak torque point is grasped and the empty vehicle acceleration is set as collation empty vehicle acceleration data, and a loaded vehicle weight is estimated based on a ratio between the empty vehicle acceleration and an average road actual working conversion value that is calculated based on an actual working acceleration that includes a gradient of a road. Further, a rear axle load is detected based on an air pressure of an air spring of a rear axle and a front axle load is obtained by subtracting the rear axle load from the vehicle weight. That is, the position of the center of gravity is obtained. However, the above-mentioned calculation is described with respect to a single vehicle, and is not described with respect to an articulated vehicle. Further, the method described in patent literature 3 is a method that detects a loaded vehicle weight and the position of the center of gravity from the acceleration during traveling. Accordingly, the method dose not satisfy the necessity of obtaining a change in the own weight and a change in the axle loads generated by getting on and off of the passengers to and from the bus when the bus is stopped at a station or a bus stop.

Further, the patent literature 3 describes a method of identifying a formula (4) relating to a stability factor and a formula (5) relating to a side slip coefficient that are indexes of a steering characteristic (lateral movement performance) by an experiment as illustrated in FIG. 3. By adapting the stability factor and the side slip coefficient that are identified by the experiment into the control, patent literature states that it is possible to provide a vehicle steering device that is adaptable to a two-wheeled vehicle, a three-wheeled vehicle and a four-wheeled vehicle. However, patent literature 3 is silent with respect to a method of obtaining cornering coefficients included in the stability factor and the side slip coefficient identified by the experiment and of reflecting such cornering coefficients to a control model. Further, patent literature 3 does not describe the application of the method to the articulated vehicle.

CITATION LIST

Patent Literature

Patent literature 1: Japanese Patent 5981010
Patent literature 2: Japanese Patent 6243079
Patent literature 3: Japanese Patent 6202700

SUMMARY OF INVENTION

Technical Problem

The above-mentioned prior art fails to describe a formula of a trajectory that a rear axle drawing on a premise that a trajectory of a rearmost axle becomes a basis of the movement of an entire vehicle body, a method of calculating a handle angle that traces the trajectory, and a method of tracing a path while suppressing a change in an articulation angle that are applicable to an articulated vehicle.

Further, the above-mentioned prior art also fails to describe an autonomous driving method of articulated vehicle for a BRT system that enables autonomous driving in such a manner where, with respect to a single bus and articulated bus, even when a state of an own vehicle such as an own weight is changed along with getting on and off of passengers at a bus stop on the same path, the same trajectory is drawn, the acceleration and the deceleration are made equal, and an inter-vehicular distance is reduced in conformity with the change in a state of the own vehicle.

The present invention discloses an automatic check helm driving technique that suppresses the amplification of an articulation angle, a trajectory method that can derive a trajectory formula that a rear axle draws on a premise that a trajectory of a rearmost axle forms a base axle, and allows a single vehicle and an articulated vehicle having different vehicle data and dimensions to trace the trajectory, and a method relating to an articulated vehicle for calculating a handle angle that traces the trajectory.

Further, the present invention discloses, with respect to tracing the same path by drawing the same trajectory, on a premise described in patent literature 1 that "the trajectory of the rearmost axle becomes the basis of the movement of the entire vehicle" in both a single vehicle and an articulated vehicle, "a method for calculating a handle angle that allows tracing a trajectory that a rear axle draws" is described with respect to an articulated vehicle That is, the present invention also discloses a method of detecting a change in a state of its own vehicle such as its own weight. The present invention also discloses an advancing path control method, an acceleration control method and a deceleration control method that uses a detected own vehicle state as data. The present invention also discloses an autonomous driving control method for a hybrid BRT system that is compatible with a change in a vehicle state amount accompanying a change in the number of passengers and a change in road surface friction.

Solution to Problem

To overcome the above-mentioned drawback, according to the present invention, there is provided a method where a path is set such that a trajectory of a rearmost axle forms the path irrespective of a single vehicle or articulated vehicle so as to allow the single vehicle or the articulated vehicle having different vehicle data and dimensions to trace the path.

The present invention also provides a formula that calculates a steering angle from a path curvature of the trajectory of the rearmost axle, that is, a control formula that is formed of geometric dimensions where a wheelbase and an articulation point position are used as parameters and stability factors.

Further, in case of the articulated bus, "the trajectory of the rearmost axle" corresponds to the motion of the center of gravity of the articulated rear vehicle. Accordingly, to induce the lateral motion model by consolidating the vehicle motion of the entire articulated vehicle to the motion of the articulated rear vehicle" so that the control formula means a front axle actual steering angle control formula of the front vehicle that corresponds to the trajectory of the rear axle of the rear vehicle or an articulation angle control formula that corresponds to the trajectory of the rear axle of the rear vehicle. The present invention also includes a tire characteristic formula that is compatible with a change in its weight and a change in a road surface friction that are included in the control formula. The present invention also includes an acceleration control formula and a deceleration control formula compatible with a change in its own weight and a change in a gradient.

According to the present invention, there is provided an autonomous driving method of an articulated vehicle where the articulated vehicle is formed of a front vehicle and a rear vehicle by way of an articulation mechanism, and the rear vehicle on which the engine is mounted pushes the front vehicle on which the engine is not mounted, an articulation angle between the front vehicle and the rear vehicle of the articulated vehicle is calculated from a curvature of a target path such that a trajectory of a rearmost axle (a center point of the rearmost axle) of the rear vehicle of the articulated vehicle traces a target path of a single vehicle, a difference between the calculated articulation angle and an actual articulation angle is converted into a steering angle, and a check helm that corresponds to the converted steering angle is applied.

According to the present invention, there is provided an autonomous driving method performed by articulated vehicles where an actual front wheel steering angle of a front vehicle is calculated from a curvature of a path of a trajectory of a rearmost axle of a rear vehicle using a following formula (1).

$$\delta = \ell_1/R_{1r} = \ell_1/)R_c^2 - \ell_c^2)^{1/3} = \ell_1/(R_{2r}^2 + \ell_2^2 - \ell_c^2)^{1/2} = \qquad (1)$$

$$\ell_1/\left\{\left(\frac{1}{\rho_{2r}}\right)^2 + \ell_2^2 - \ell_c^2\right\}^{1/2} = \frac{\rho_{2r}}{|\rho_{2r}|}\ell_1/\left\{\left(\frac{1}{\rho_{2r}}\right)^2 + \ell_2^2 - \ell_c^2\right\}^{1/2}$$

In the formula (1), δ indicates an actual front wheel steering angle of the front vehicle, $l_1$ indicates a wheelbase of the front vehicle, R1r indicates a turning radius of the center of the rear axle of the front vehicle, Rc indicates a radius of turning of the articulation point, $l_c$ indicates a distance from a rear axle of the front vehicle to the articulation point, R2r indicates a turning radius of a rear axle of the rear vehicle, ρ2r is a radius of curvature of the rear axle of the rear vehicle (that is, a curvature of a path of the trajectory of the rearmost axle), $l_2$ is a distance from the articulation point to the rear axle of the rear vehicle, ρ2r/|p2r| is a term for matching positive and negative symbols of the actual front wheel steering angle of the front vehicle and the radius of curvature of the rear axle of the rear vehicle.

According to the present invention, there is provided an autonomous driving method performed by articulated vehicles where a "stability factor" is obtained by an experiment and a following formula (2) is obtained by multiplying the above-mentioned formula (1) by the stability factor.

$$\delta = \frac{\rho_{2r}}{|\rho_{2r}|}\left(1 + K_{sf}v^2\right)\ell_1/\left\{\left(\frac{1}{\rho_{2r}}\right)^2 + \ell_2^2 - \ell_c^2\right\}^{1/2} \qquad (2)$$

In the formula (2), Ksf indicates the stability factor.

According to the present invention, there is provided an autonomous driving method performed by an articulated vehicle, wherein an actual articulation angle is calculated from a cosec that is obtained by dividing a wheel speed of a rearmost axle of the rear vehicle by a wheel speed of the rear axle of the front vehicle using a calculation formula (3) and a calculation formula (4), an excess or a shortage of an actual articulation angle with respect to the articulation angle at the time of tracing the target path is determined by subtracting the actual articulation angle from the articulation angle at the time of tracing the target path, the excess or the shortage of the articulation angle is converted into an excess or a shortage of a steering angle by the calculation formula (5), and this excess or shortage value is adjusted by a PID controller and is added to a steering angle controlled variable so that a helm angle is obtained.

$$\delta_{12} = \frac{\ell_2}{R_{2r}} + \frac{\ell_c}{R_{1r}} = \frac{\ell_2}{R_{2r}} + \frac{\ell_c}{\ell_1}\delta \qquad (3)$$

$$\because \delta = \frac{\ell_1}{R_{1r}} \qquad (4)$$

$$\delta = \frac{\ell_1}{\ell_c}\left(\delta_{12} - \frac{\ell_2}{R_{2r}}\right) \qquad (5)$$

In the formulas (3), (4) and (5), δ12 is an articulation angle, $l_2$ is a length from the rearmost axle of the rear vehicle to the articulation point, and R2r indicates a turning radius of the rearmost axle of the rear vehicle and hence, $l_2$/R2r becomes "an angle between the rear axle of the rear vehicle and the articulation point". $l_c$ is a length from the rear axle of the front vehicle to the articulation point, $l_c$/R1r indicates a turning radius of the rear axle of the front vehicle and hence, δ becomes "an angle between the rear axle of the front vehicle and the articulation point".

Advantageous Effects of Invention

According to the present invention, it is possible to provide the bus rapid transit (BRT) system that travels on a single-vehicle and articulated-vehicle common-use path and hence, the autonomous driving of the articulated vehicle on the path can be realized. Further, according to the present invention, it is possible to establish the bus rapid transit (BRT) system that travels on a single-vehicle and articulated-vehicle common-use path and, at the same time, it is also possible to establish a bus rapid transit system that is compatible to a change in state in the inside of the vehicle such as its own weight, the position of the center of gravity and the like brought about by a change in the number of passengers, and a change in state outside the vehicle such as a gradient of a road, wetting of a road surface.

BRIEF DESCRIPTION OF DRAWINGS

FIG. 1 is an explanatory view illustrating a difference between a railway trajectory and an automobile trajectory.

FIG. 2 is an explanatory view illustrating a rear axle of single vehicle and a rearmost axle of articulated vehicle share the same trajectory.

FIG. 3 is an explanatory view of a formula for calculating a steered angle of front vehicle from a path curvature.

FIG. 4 is an explanatory view of a control formula where a "stability factor" is obtained by an experiment and "the formula for calculating a steered angle of a front wheel from a path curvature" is multiplied by the stability factor.

FIG. 5 is an explanatory view of the control method into which a check helm is added.

FIG. 6 is an explanatory view of a lateral motion model of the articulated vehicle.

FIG. 7 is an explanatory view for a state equation of articulated vehicle lateral motion.

FIG. 8 is an explanatory view of an identification experiment of the lateral motion model of articulated vehicle.

FIG. 9 is an explanatory view of mounted sensors that detect gross vehicle weight, vehicle gravity center location and axle loads.

FIG. 10 is an explanatory view of a detection flow of detecting change in gross vehicle weight, gravity center location and axle loads.

FIG. 11 is an explanatory view of a traveling performance curve and an acceleration formula expressed in terms of acceleration.

FIG. 12 is an explanatory view of estimation of a gradient.

FIG. 13 is an explanatory view of a deceleration control formula.

FIG. 14 is an explanatory view of a vehicle (dynamic) model that functions by making GPS, a magnetic marker and an inertial measurement match with each other.

DESCRIPTION OF EMBODIMENTS

An embodiment of the present invention is described with reference to FIG. 1 to FIG. 14.

FIG. 1 illustrates a difference between a railway trajectory and an automobile. The trajectory of the railway is illustrated on a left side of the drawing, and the trajectory of the automobile is described on the right side.

The railway draws the same track trajectory where left and right wheels on a front axle and left and right wheels on a rear axle pass the same tracks. On the other hand, in the automobile, an inner wheel track difference is generated between a track of a turning inner wheel on a front axle and a track of the turning inner wheel on a rear axle, and an outer wheel track difference is generated between a track of a turning outer wheel on the front axle and a track of the turning outer wheel on the rear axle and hence, in the automobile, the front wheels and the rear vehicles do not pass the same tracks. Accordingly, in realizing an autonomous driving control of an automobile, it is necessary to take into account which trajectory is to be determined as a basic axle between a front axle and a rear axle. For example, in determining a trajectory of a bus rapid transit (BRT) system, in realizing an autonomous driving control of the automobile, it is necessary to consider which trajectory is to be determined as a basic axle between a front axle and a rear axle.

FIG. 2 illustrates that a rear axle of a single vehicle and a rearmost axle of the articulated vehicle share or take the same trajectory. The trajectory of the single vehicle is illustrated on the left side of the drawing, and the trajectory of the articulated vehicle is illustrated on the right side of the drawing. It is understood that the trajectory of the center of the rear axle of the single vehicle indicated by a dotted line and the trajectory of the center of the rear axle of the rear vehicle of the articulated vehicle indicated by a dotted line share or take the same trajectory. From the above, it is necessary to determine the trajectory of the bus rapid transit system (BRT) based on the trajectory of the rearmost axle.

FIG. 3 explains a formula for calculating a steered angle of a front vehicle from a path curvature. On a lower side of FIG. 3, simplified view is drawn where the articulated vehicle is advancing toward a right side in the drawing by changing an advancing path from the left side in the drawing. Assume that the articulated vehicle traces an advancing path change curve having an advancing path change distance L and an advancing path width D from an origin (0 point) of a trajectory where a direction that the articulated vehicle advances toward a front side is set as an x axis, and a direction that the articulated vehicle advances toward a lateral side is set as a y axis. This advancing path change curve is expressed by a numerical formula or coordinates and azimuths. Curvatures can be calculated from the coordinates and the azimuths. The rearmost axle center passes the path determined in this manner.

Assuming a turning radius of the rearmost axle as $R_{2r}$, a curvature of the rearmost axle as $\rho_{2r}$, a distance from the center of the turning radius of the rearmost axle to an articulation point (a turning radius of the articulation point) as $R_c$ and, in the same manner, a turning radius of a rear axle of the front wheel as $R_{1r}$ and a turning radius of a front axle of the rear vehicle as $R_{1f}$, the steered angle of front vehicle is expressed by a formula (1). This formula (1) is a geometric formula where an intersecting point between an R2 axis and R1 axis having no steering mechanism is set as the center of turning, and the center of the front wheel of the front vehicle agrees with the above-mentioned intersecting point. The formula (1) is established in a very low speed region or in a low speed region.

$$\delta = \ell_1/R_{1r} = \ell_1/\left(R_c^2 - \ell_c^2\right)^{1/2} = \ell_1/\left(R_{2r}^2 + \ell_2^2 - \ell_c^2\right)^{1/2} = \ell_1/\left\{\left(\frac{1}{\rho_{2r}}\right)^2 + \ell_2^2 - \right. \quad (1)$$

8

$$\left. \ell_c^2\right\}^{1/2} = \frac{\rho_{2r}}{|\rho_{2r}|}\ell_1/\left\{\left(\frac{1}{\rho_{2r}}\right)^2 + \ell_2^2 - \ell_c^2\right\}^{1/2}$$

In the above-mentioned formula, $\delta$ indicates the steered angle of the front wheel of the front vehicle, $\ell_1$ indicates a wheelbase of the front vehicle, R1f indicates a steered angle of the front wheel of the front vehicle. R1r indicates a turning radius of the actual steering angle of the front wheel of the front vehicle, Rc indicates a radius of rotation of the articulation point, fc indicates a distance from a rear axle of the front vehicle to the articulation point, R2r indicates a turning radius of a rear axle of the rear vehicle, $\rho_{2r}$ is a radius of curvature of the rear axle of the rear vehicle (that is, a curvature of a path of the trajectory of the rearmost axle), $\ell_2$ is a distance from the articulation point to the rear axle of the rear vehicle, $\rho_{2r}/|\rho_{2r}|$ is a term for matching positive and negative symbols of the actual steering angle of the front wheel of the front vehicle and the radius of curvature of the rear axle of the rear vehicle.

The vehicle includes a GPS or the like that takes a curvature of the path trajectory as the curvature of the path $\rho_{2r}$ of the trajectory of the rearmost axle. In a case where such equipment is applied to a rear axle of the front vehicle instead of the rear axle of the rear vehicle, an articulation angle sensor may be also provided together, the conversion of R2r, Rc, R1r may be performed, and a formula of the turning radius of the rear axle of the front vehicle on a left end of the formula (1) that is equal to the formula expressed by the radius of curvature of the rear axle of the rear vehicle on a right end of the formula (1).

FIG. 4 describes a control formula where a "stability factor" is obtained by an experiment and "the formula for calculating a steered angle of a front wheel of a front vehicle from a path curvature" is multiplied by the stability factor.

On a left side of the drawing, the articulated vehicle that performs a steady circular turning is illustrated in a simplified manner. When a vehicle speed is gradually increased while keeping the steered angle of the front axle of the front wheel, the center of turning ($O_{vo}$) in a very low speed state or in a low speed state is moved to an ($O_{vup}$) point along with the increase of a vehicle speed. A yaw rate $\gamma$, a lateral slip angle $\beta$ that follow the increase of the elevation of a vehicle speed v at the point of center of gravity of the rear vehicle are measured, and vehicle speed dependency ($\beta v/\beta o$) of the lateral slip angle and vehicle speed dependency (Rv/Ro) of the radius of rotation illustrated on a right side of the drawing are obtained by an experiment. Assume a change in gradient of ($\beta v/\beta o$) from a state where a vehicle speed is zero as a lateral slip coefficient $K_{\beta o}$ following the case of the single vehicle, and assume a gradient of (Rv/Ro) as a stability factor $K_{sf}$ following the case of the single vehicle. A formula (2) is obtained by multiplying the formula (1) illustrated in FIG. 3 by a change formula $(1+K_{sf}V^2)$ of a change in a rotation radius that accompanies the elevation of a vehicle speed, and a control formula of actual front wheel steering angle $\delta$ that corresponds to the path curvature $\rho_{2r}$ is obtained.

$$\delta = \frac{\rho_{2r}}{|\rho_{2r}|}(1 + K_{sf}v^2)\ell_1/\left\{\left(\frac{1}{\rho_{2r}}\right)^2 + \ell_2^2 - \ell_c^2\right\}^{1/2} \quad (2)$$

In the formula (2), $K_{sf}$ indicates a stability factor.

It is preferable that the stability factor $K_{sf}$ takes a "positive" value from a viewpoint of the acquisition of stability of the control. However, in the case of the articulated vehicle, a method is where the articulated vehicle advances by making the rear vehicle push the front vehicle and hence, it is estimated that an articulation angle changes so that the stability factor $K_{sf}$ takes a "negative" value. A provision that is taken to cope with such an estimated case is described with reference to FIG. 5.

FIG. 5 illustrates an explanatory view of the control method into which a check helm is added. That is, FIG. 5 illustrates Simulink that flows from the left to the right in the drawing.

An articulation angle corresponding to a target curvature is obtained from the curvature of a target path. An actual articulation angle is obtained by a vehicle local area network (LAN), or an actual articulation angle is calculated by the formula (3) and the formula (4) from a cosec that is obtained by dividing a wheel speed of the rear axle of the rear vehicle by a wheel speed of the rear axle of the front wheel. The actual articulation angle is subtracted from the target articulation angle. By making the subtracted value pass through a Switch Block, An excess or a shortage of an actual value with respect to a target value is determined. The excess or the shortage of the articulation angle is converted into an excess value or a shortage value of a steering angle by a formula (5). The excess value or the shortage value is adjusted by a PID controller, and a helm angle is obtained by adding the adjusted value to a steering angle controlled variable.

$$\delta_{12} = \frac{\ell_2}{R_{2r}} + \frac{\ell_c}{R_{1r}} = \frac{\ell_2}{R_{2r}} + \frac{\ell_c}{\ell_1}\delta \tag{3}$$

$$\therefore \delta = \frac{\ell_1}{R_{1r}} \tag{4}$$

$$\delta = \frac{\ell_1}{\ell_c}\left(\delta_{12} - \frac{\ell_2}{R_{2r}}\right) \tag{5}$$

In the formulas (3) to (5), $\delta 12$ is an articulation angle. $l_2$ is a length from the rear axle of the rear vehicle to the articulation point, R2r indicates a turning radius of the rear axle of the rear vehicle and hence, $\delta 12$ becomes "an angle between the rear axle of the rear vehicle and the articulation point". $l_c$ is a length from the rear axle of the front vehicle to the articulation point, R1r indicates a turning radius of the rear axle of the front vehicle and hence, $\delta_{12}$ becomes "an angle between the rear axle of the front vehicle and the articulation point".

That is, the sum of an "angle between the rear axle of the rear vehicle" and the articulation point" and an "angle between the rear axle of the front vehicle" and the articulation point" becomes an "articulation angle $\delta 12$". The formula (3) is established by adding the relationship formula (4) between the turning radius of the rear axle of the front vehicle, the wheelbase of the front vehicle and the actual steering angle to the above-mentioned relationship, and the formula (3) can be converted into the formula (5).

FIG. 6 illustrates a lateral motion model of the articulated vehicle. A vehicle plan view is arranged on a left side of the drawing, and a vehicle model view is arranged on a right side of the drawing. In the vehicle plan view, from an upper portion to a lower portion of the drawing, the front vehicle, the articulation mechanism and the rear vehicle are illustrated. That is, the articulation mechanism is disposed below the front vehicle, and the rear vehicle is disposed below the articulated mechanism, and a profile of the front vehicle in a state where (an articulation angle ($\delta_{12}$) is generated is indicated by a dotted line. The configuration where the handle, the front axle (steering wheel), the center of gravity, and the rear axle (driven axle) are mounted on the front vehicle is illustrated. The configuration where the center of gravity and the rear axle (drive axle) are mounted on the rear vehicle is illustrated. These constitutional elements illustrated in the drawing form the vehicle state quantities relating to a change in total vehicle weight, a change in axle load, a change in a tire characteristic, and a lateral motion (a change in advancing path) of the vehicle brought about by the manipulation of the handle. To express these vehicle state quantities by symbols, the vehicle model view on the right side of the drawing is obtained.

Leader lines, dimension lines and symbols $l_1$, $l_c$, $l_2$, $R_{f1}$, $R_{r1}$, Rc, $R_{r2}=1/\rho_{2r}$ and "0" indicate symbols indicating geometric dimensions relating static turning at the time of very slow rotation. The static turning is determined by geometric dimensions including radiuses $R_{f1}$, $R_{r1}$, $R_{f2}$, $R_{r2}$ that intersect with each other at a point O on an extension of the rear axle of the rear vehicle and vehicle body sizes $l_1$, $l_c$, $l_2$. The relationship formula is expressed by a formula (0).

$$\delta = \ell_1/R_{1f} = \ell_1/(R_{2r}^2 + \ell_2^2 - \ell_c^2)^{1/2} = \ell_1/\left\{\left(\frac{1}{\rho_{2r}}\right)^2 + \ell_2^2 - \ell_c^2\right\}^{1/2} = \frac{\rho_{2r}}{|\rho_{2r}|}\ell_1/ \tag{0}$$

$$\left\{\left(\frac{1}{\rho_{2r}}\right)^2 + \ell_2^2 - \ell_c^2\right\}^{1/2}$$

In the formula (0), $\rho_{2r}/|\rho_{2r}|$ is a term for aligning positive and negative symbols of the front-vehicle front-wheel actual steering angle $\delta$ and a curvature rotation radius of the rear-vehicle rear-axle. The dynamic turning after a vehicle speed is increased is determined by a dynamic balance relationship between an inertial force generated on a mass of the vehicle body and road surface friction forces generated on the respective axle tires. The state of quantity of the vehicle relating to the dynamic balance is described hereinafter.

The $x_1y_1$ coordinates that use the center of gravity of the front vehicle as an origin and the $x_2y_2$ coordinates that use the center of gravity of the rear vehicle as an origin are set. The $x_1y_1$ coordinates and the $x_2y_2$ coordinates are articulated to each other at the articulation point $p_c$, and an articulation angle is set as $\delta_{12}$. A mass $m_1$, $m_2$ and an inertial moment $I_1$, $I_2$ are placed at a position of center of gravity with respect to the front vehicle and the rear vehicle respectively. Speeds of the centers of gravity of these vehicles are set as $v_1$, $v_2$, vehicle-body lateral slip angles are set as $\beta_1$, $\beta_2$ and yaw rates about the centers of gravity are set as $\gamma_1$, $\gamma_2$. A front-vehicle front-axle tire that is formed by collecting front-axle left-and-right wheels at the center is placed on a front side $l_{f1}$ from the point of the center of gravity of the front vehicle, the tire speed is set as $v_{f1}$, a tire steered angle is set as $\delta$, a tire side slip angle is set as $\beta_{f1}$, and a cornering force that the tire generates is set as $CF_1$. A front-vehicle rear-axle tire that is formed by collecting rear-axle left-and-right wheels at the center is placed on a rear side $l_{r1}$ from the point of the center of gravity of the front vehicle, the tire speed is set as $v_r1$, a tire lateral slip angle is set as $\beta_{r1}$, and a cornering force that the tire generates is set as $CR_1$. A rear-vehicle rear-axle tire that is formed by collecting rear-axle left-and-right wheels at the center is placed on a rear side $_{r2}$ from the point of the center of gravity of the rear vehicle, the tire speed is set as $v_{r2}$, a tire lateral slip angle is

11 set as $\beta_{r2}$, and a cornering force that the tire generates is set as $CR_2$. The articulation point $p_c$ is placed at a position behind the center of gravity of the front vehicle and at the position in front of the center of gravity of the rear vehicle. A longitudinal load that acts on the articulation point is set as Fx, a lateral load is set as Fy, a lateral slip angle of the front vehicle at the articulation point is set as Ppl, and a lateral slip angle of the front vehicle at the articulation point is set as $\beta$p2.

Deriving of an equation of state of the lateral motion model of the articulated vehicle is described with reference to FIG. 7. With respect to the front vehicle and the rear vehicle that are articulated at the articulation point $p_c$, an articulation separation state is illustrated on a left side of the drawing, and an articulated state is illustrated on a right side of the drawing, and a constraining condition at the articulation point is described. First, using the right side view, an equation of equilibrium of the longitudinal motion of the front vehicle, an equation of equilibrium of the lateral motion of the front vehicle, an equation of equilibrium of the rotary motion of the front vehicle, and an equation of equilibrium of the longitudinal motion of the rear vehicle, an equation of equilibrium of the lateral motion of the rear vehicle, an equation of equilibrium of the rotary motion of the rear vehicle are described. Thereafter, using the left side view, a constraining condition formula of the articulation portion is described.

The equilibrium formulas of the front vehicle are expressed as follows equilibrium formula in $x_1$ axis direction $$m_1(\dot{v}_{x1} - v_{y1}r_1) = F_x\cos\delta_{12} + F_y\sin\delta_{12} - CF_1\sin(\delta + \beta_{f1}) - CR_1\sin\beta_{r1} \quad (1)$$

equilibrium formula in $y_1$ axis direction:

$$m_1(\dot{v}_{y1} + v_{x1}r_1) = -CF_1\cos(\delta + \beta_{f1}) - CR_1\cos\beta_{r1} - F_x\sin\delta_{12} - \quad (2)$$
$$F_y\cos\delta_{12}$$

equilibrium formula of moment around $z_1$ axis:

$$I_1\dot{r}_1 = -CF_1\ell_{f1}\cos(\delta + \beta_{f1}) + CR_1\ell_{r1}\cos\beta_{r1} + \ell_{c1}F_x\sin\delta_{12} + \quad (3)$$
$$\ell_{c1}F_y\cos\delta_{12}$$

The equilibrium formulas of the rear vehicle are expressed as follows equilibrium formula in $x_2$ axis direction:

$$m_2(\dot{v}_{x2} - v_{y2}r_2) = -F_x - CR_2\sin\beta_{r2} \quad (4)$$

equilibrium formula in $y_2$ axis direction:

$$m_2(\dot{v}_{y2} + v_{x2}r_2) = -CR_2\cos\beta_{r2} - F_y \quad (5)$$

12 equilibrium formula of moment around $z_2$ axis:

$$I_2\dot{r}_2 = -\ell_{f2}F_y - CR_2\ell_{r2}\cos\beta_{r2} \quad (6)$$

A constraint condition formulas of the an articulation point are as follows $$v_{x1} = v_{x2}/\cos\delta_{12} - (v_{y2} + \ell_{f2}r_2)\sin\delta_{12} \quad (7)$$
$$v_{y1} = -v_{x2}\sin\delta_{12} + (v_{y2} + \ell_{f2}r_2)\cos\delta_{12} \quad (8)$$
$$\delta_{12} = \omega_1 - \omega_2 \quad (9)$$
$$\delta_{12} = \beta_{p2} + \beta_{p1} \quad (10)$$

The lateral slip angles of the respective tires are as follows.

$$\beta_{f1} = \beta_1 + \tan^{-1}(\ell_{f1}r_1/v_{x1}) - \delta \quad (11)$$
$$\beta_{r1} = \beta_1 - \tan^{-1}(\ell_{r1}r_1/v_{x1}) \quad (12)$$
$$\beta_{r2} = \beta_2 - \tan^{-1}(\ell_{r2}r_2/v_{x2}) \quad (13)$$

To derive "the lateral motion model by consolidating the vehicle motion of the entire articulated vehicle to the motion of the articulated rear vehicle," it is necessary to express a yaw angle ($\omega_1$) of the front vehicle and a lateral slip angle ($\beta_1$) of the front vehicle by a yaw angle ($\omega_2$) of the rear vehicle and a lateral slip angle ($\beta_2$) of the rear vehicle. The correspondence between these factors is described hereinafter.

In a case where a lateral slip angle of the articulation point is obtained by developing a lateral slip angle of the point of center of gravity of ($\beta_1$) the front vehicle, a following formula (14) is obtained, while in a case where a lateral slip angle of the articulation point is obtained by developing a lateral slip angle of the point of center of gravity of ($\beta_2$) of the rear vehicle, a following formula (15) is obtained.

$$\beta_{p1} = \beta_2 - \ell_{c1}r_1/v_{x1} \approx \beta_1 - \ell_{c1}r_1/v_1 \quad (14)$$
$$\beta_{p2} = \beta_2 + \ell_{f2}r_2/v_{x2} \approx \beta_2 + \ell_{f2}r_2/v_2 \quad (15)$$

With respect to a lateral slip angle of a point of a center of gravity of the front vehicle, a formula (14a) is obtained by developing the formula (14), and a formula (14b) is obtained by substituting $\beta_p1$ with $\beta_p1$ in the formula (10).

$$\beta_1 = \beta_{p1} + \ell_{c1}r_1/v_1 \quad (14a)$$
$$= \beta_{p2} - \delta_{12} + \ell_{c1}r_1/v_1 \quad (14b)$$

By substituting $\beta$p2 in the formula (14b) with the formula (15), a formula (14c) is obtained.

$$\beta_1 = \beta_2 + \ell_{f2}r_2/v_2 - \delta_{12} + \ell_{c1}r_1/v_1 \quad (14c)$$

A yaw rate $\gamma_1$ of the front vehicle is included in the formula (14c). This is expressed as a state of quantity of the rear vehicle. With respect to the yaw rate $\gamma_1$ of the front vehicle and a yaw rate $\gamma_2$ of the rear vehicle in the formula (14c), by developing the formula (9a) as describe below, it is regarded that the yaw rate $\gamma1$ is equal to the yaw rate $\gamma_2$ ($\gamma_1 = \gamma_2$), and the formula (14b) is formulated as a formula (14d).

$$\omega_1 = \omega_2 + \delta_{12} \tag{9a}$$

$$\therefore \dot{\omega}_1 = \dot{\omega}_2 + \dot{\delta}_{12}$$

$$r_1 = r_2 + \dot{\delta}_{12}$$

In the above-mentioned formula, assuming that $\delta12$ (a very small change in vehicle speed) satisfies a relationship of $\delta12 \approx 0$, a relationship of $\gamma_1 \approx \gamma_2$ is established. Further, in a steady state, a relationship of $\gamma_1 = \gamma_2$ is established. Accordingly, the formula (14c) is converted to the formula (14d) by replacing $\gamma_1$ with $\gamma_2$.

$$\beta_1 = \beta_2 + \ell_{f2} r_2/v_2 - \delta_{12} + \ell_{c1} r_2/v_1 \tag{14d}$$

Assuming that a relationship of $v_2/\cos \delta_{12} \approx v_2$ is satisfied, the formula (14d) is converted into a formula (14e).

$$\beta_1 = \beta_2 + \ell_{f2} r_2/v_2 - \delta_{12} + \ell_{c1} r_2/v_2 \tag{14e}$$

$$= \beta_2 + \delta_{12} + (\ell_{c1} - \ell_{f2}) r_2/v_2$$

Hereinafter, as steady traveling, assuming that a relationship of $v_{x1}=0$, $v_{x2}=0$, a relationship of $v_{y1}=0$, $v_{y2}=0$, and $\sin()$, $\cos()=1$, $\tan^{-1}() \approx ()$ are satisfied, the formulas are simplified.

A control formula of a lateral motion model where the vehicle motion of the entire articulated vehicles is consolidated as the motion of the articulated rear vehicle becomes as follows in a case where a cornering force (CF1, CR1, CR2) of each axle is expressed as a product of load (Nf1, Nr1, Nr2) of each axle and a cornering coefficient that corresponds to a road surface friction coefficient of each axle (the cornering coefficient at the front axle of the front vehicle being indicated by Ccf, and the cornering coefficient at the rear axle of the front vehicle and the rear axle of the rear vehicle being indicated by Ccr).

Lateral Formula $$\left\{ (C_{cf} N_{f1} + C_{cr} N_{r1}) \left(1 + \frac{m_1 + m_2}{m_2}\right) + C_{cr} N_{r2} \right\} \beta_2 + \tag{2k}$$

$$\left\{ (m_1 - m_2) v_{x2} + \frac{1}{v_2} (C_{cf} N_{f1} + C_{cr} N_{r1})(\ell_{c1} - \ell_{f2}) + \right.$$

$$\left. \frac{1}{v_{x1}} (C_{cf} N_{f1} \ell_{f1} - C_{cr} N_{r1} \ell_{r1}) - \frac{1}{v_{x2}} (C_{cr} N_{r2} \ell_{r2}) \right\} r_2 = C_{cf} N_{f1} \delta$$

Rotation Formula $$\left\{ -C_{cf} N_{f2} \ell_{f1} \left(1 + \frac{m_1 + m_2}{m_2}\right) + C_{cr} \left[ N_{r1} \ell_{r1} \left(1 + \frac{m_1 + m_2}{m_2}\right) + N_{r2} \ell_{c1} \frac{\ell_{r2}}{\ell_{f2}} \right] \right\} \tag{3j}$$

-continued $$\beta_2 + \left[ -C_{cf} N_{f1} \{(\ell_{c1} - \ell_{f2})/v_2 + \ell_{f1}/v_{x1}\} \ell_{f1} + \right.$$

$$\left. C_{cr} \left\{ \frac{N_{r1}(\ell_{c1} - \ell_{f2}) \ell_{r1}}{v_2} - \frac{\ell_{r1}^2}{v_{x1}} - \ell_{c1} \frac{\ell_{r2}}{\ell_{f2}} N_{r2} \ell_{r2}/v_{x2} \right\} \right] r_2 =$$

$$-(+C_{cf} N_{f1} \ell_{f1} - C_{cr} N_{r1} \ell_{r1}) \delta$$

A relationship formula between the yaw rate $\gamma2$ of the rear vehicle and the steered angle $\delta$ of the front wheel is formulated by applying the lateral equation (2k) and the rotation formula (3j) to the solutions of simultaneous linear equations.

In the formula (16), the simultaneous linear equations become as follows.

$$a_1 x + b_1 y = c_1 z \tag{2m}$$

$$\alpha_2 x + b_2 x = c_2 z \tag{3m}$$

Assuming x as $\beta_2$, y as $\gamma_2$ and z as $\delta$, these values are expressed as follows.

$$a_1 = (C_{cf} N_{f1} + C_{cr} N_{r1}) \left(1 + \frac{m_1 + m_2}{m_2}\right) + C_{cr} N_{r2}$$

$$b_1 = (m_1 - m_2) v_{x2} + \frac{1}{v_2} (C_{cf} N_{f1} + C_{cr} N_{r1})(\ell_{c1} - \ell_{f2}) +$$

$$\frac{1}{v_{x1}} (C_{cf} N_{f1} \ell_{f1} - C_{cr} N_{r1} \ell_{r1}) - \frac{1}{v_{x2}} (C_{cr} N_{r2} \ell_{r2})$$

$$c_1 = C_{cf} N_{f1}$$

$$a_2 = -C_{cf} N_{f1} \ell_{f1} \left(1 + \frac{m_1 + m_2}{m_2}\right) + C_{cr} \left[ N_{r1} \ell_{r1} \left(1 + \frac{m_1 + m_2}{m_2}\right) + N_{r2} \ell_{c1} \frac{\ell_{r2}}{\ell_{f2}} \right]$$

$$b_2 = -C_{cf} N_{f1} \{(\ell_{c1} - \ell_{f2})/v_2 + \ell_{f1}/v_{x1}\} \ell_{f1} +$$

$$C_{cr} \left\{ N_{r1}(\ell_{c1} - \ell_{f2}) \ell_{r1}/v_2 - \ell_{r1}^2/v_{x1} - \ell_{c1} \frac{\ell_{r2}}{\ell_{f2}} N_{r2} \ell_{r2}/v_{x2} \right\}$$

$$c_2 = -(+C_{cf} N_{f1} \ell_{f1} - C_{cr} N_{r1} \ell_{r1})$$

Accordingly, the formulas of the simultaneous linear equations become as follows.

$$x = \begin{vmatrix} c_1 & b_1 \\ c_2 & b_2 \end{vmatrix} z + \begin{vmatrix} a_1 & b_1 \\ a_2 & b_2 \end{vmatrix} = \frac{c_1 b_2 - c_2 b_1}{a_1 b_2 - a_2 b_1} z$$

$$y = \begin{vmatrix} a_1 & c_1 \\ a_2 & c_2 \end{vmatrix} z + \begin{vmatrix} a_1 & b_1 \\ a_2 & b_2 \end{vmatrix} = \frac{a_1 c_2 - a_2 c_1}{a_1 b_2 - a_2 b_1} z$$

$$z = \frac{a_1 b_2 - a_2 b_1}{c_1 b_2 - c_2 b_1} x$$

$$z = \frac{a_1 b_2 - a_2 b_1}{a_1 c_2 - a_2 c_1} y$$

From these values, a lateral slip angle of the point of center of gravity of the rear vehicle with respect to an actual steering angle of the front vehicle is expressed by a formula (16) and a yaw rate is expressed by a formula (17).

$$\beta_2 = \frac{c_1 b_2 - c_2 b_1}{a_1 b_2 - a_2 b_1} \delta \tag{16}$$

-continued $$r_2 = \frac{a_1 c_2 - a_2 b_1}{a_1 b_2 - a_2 b_1} \delta \tag{17}$$

From the formula (16), the following formula (16a) is obtained.

$$\delta = \frac{a_1 b_2 - a_2 b_1}{c_1 b_2 - c_2 b_1} \beta_2 \tag{16a}$$

From the formula (17), the following formula (17a) is obtained.

$$\delta = \frac{a_1 b_2 - a_2 b_1}{a_1 c_2 - a_2 c_1} \quad r_2 = \frac{a_1 b_2 - a_2 b_1}{a_1 c_2 - a_2 c_1} \rho v_2 \tag{17a}$$

In the formula (17a), $\rho$ indicates a radius of curvature of a rearmost axle path of the rear vehicle, and $v_2$ indicates a speed of the center of gravity of the rear vehicle.

With respect to the derived formulas (16), (17), to allow the identification by an experiment, these formulas (16, 17) are developed to formulas expressed by a lateral slip coefficient and a stability factor.

First, from the formula (16) relating to the lateral slip angle, the following formulas (16h), (17i) are obtained.

$$\beta_2/\beta_{20} = \frac{1 + (C_{cf}N_{f1}\ell_{f1} - C_{cr}N_{r1}\ell_{r1})(m_1 - m_2)v_2^2}{1 - \left\{-C_{cf}N_{f1}\ell_{f1}\left(1 + \frac{m_1 + m_2}{m_2}\right) + C_{cr}\left[N_{r1}\ell_{r1}\left(1 + \frac{m_1 + m_2}{m_2}\right) + N_{r2}\ell_{c1}\frac{\ell_{r2}}{\ell_{f2}}\right]\right\}(m_1 - m_2)v_2^2} = \frac{1 + K_{\beta o}v_2^2}{1 + K_{SF}v_2^2} \tag{16h}$$

$$k_{\beta o} = (C_{cf}N_{f1}\ell_{f1} - C_{cr}N_{r1}\ell_{r1})(m_1 - m_2) \tag{16i}$$

$$K_{SF} = -\left\{-C_{cf}N_{f1}\ell_{f1}\left(1 + \frac{m_1 + m_2}{m_2}\right) + C_{cr}\left[N_{r1}\ell_{r1}\left(1 + \frac{m_1 + m_2}{m_2}\right) + N_{r2}\ell_{c1}\frac{\ell_{r2}}{\ell_{f2}}\right]\right\}(m_1 - m_2) \tag{17i}$$

In these formulas (16h), (17i), $\beta_{20}$ indicates $\beta_2$ when a vehicle speed is zero, $K_{\beta o}$ indicates a lateral slip coefficient, and $K_{SF}$ indicates a stability factor.

Next, from the formula (17) relating to the yaw rate, a following formula (17h) is obtained.

$$R_2/R_{20} = 1 - \left\{-C_{cf}N_{f1}\ell_{f1}\left(1 + \frac{m_1 + m_2}{m_2}\right) + \right. \tag{17h}$$

$$\left. C_{cr}\left[N_{r1}\ell_{r1}\left(1 + \frac{m_1 + m_2}{m_2}\right) + N_{r2}\ell_{c1}\frac{\ell_{r2}}{\ell_{f2}}\right]\right\}(m_1 - m_2)v_2^2\} = 1 + K_{SF}v_2^2 \tag{65}$$

In the formula (17h), $R_{20}$ indicates $R_2$ when a vehicle speed is zero, $K_{SF}$ indicates a stability factor, and the formula (17h) becomes equal to the above-mentioned formula (17i) derived from the formula (16) relating to the lateral slip coefficient.

By solving the linear simultaneous equations consisting of the equation (16i) relating to the lateral slip coefficient $K_{\beta\theta}$ and the equation (17i) of the stability factor KSF, a formula (18) relating to a front axle cornering coefficient Ccf of the front vehicle and a formula (19) relating to a cornering coefficient Ccr of the rear axle of the front vehicle and the rear vehicle are obtained.

$$C_{cf} = \frac{k_{\beta o}\left[N_{r1}\ell_{r1}\left(1 + \frac{m_1 + m_2}{m_2}\right) + N_{r2}\ell_{c1}\frac{\ell_{r2}}{\ell_{f2}}\right](m_1 - m_2) - K_{SF}N_{r1}\ell_{r1}(m_1 - m_2)}{N_{f1}\ell_{f1}(m_1 - m_2)\left[N_{r1}\ell_{r1}\left(1 + \frac{m_1 + m_2}{m_2}\right) + N_{r2}\ell_{c1}\frac{\ell_{r2}}{\ell_{f2}}\right](m_1 - m_2) - N_{f1}\ell_{f1}\left(1 + \frac{m_1 + m_2}{m_2}\right)(m_1 - m_2)N_{r1}\ell_{r1}(m_1 - m_2)} \tag{18}$$

$$C_{cr} = \frac{N_{f1}\ell_{f1}(m_1 - m_2)K_{SF} - N_{f1}\ell_{f1}\left(1 + \frac{m_1 + m_2}{m_2}\right)(m_1 - m_2)k_{\beta o}}{N_{f1}\ell_{f1}(m_1 - m_2)\left[N_{r1}\ell_{r1}\left(1 + \frac{m_1 + m_2}{m_2}\right) + N_{r2}\ell_{c1}\frac{\ell_{r2}}{\ell_{f2}}\right](m_1 - m_2) - N_{f1}\ell_{f1}\left(1 + \frac{m_1 + m_2}{m_2}\right)(m_1 - m_2)N_{r1}\ell_{r1}(m_1 - m_2)} \tag{19}$$

From the formula (18) and the formula (19), by grasping the cornering coefficients on a dry road surface by performing an experiment, and by adjusting these values, the system is compatible with traveling under a low friction environment such as rains and piled snows.

An identification experiment of a lateral motion model of articulated vehicles is described with reference to FIG. 8. As illustrated on a left side of FIG. 8, a view that illustrates the articulated vehicle that performs a steady circular turn by fixing (holding) an actual steering angle $\delta$ of the front axle the front vehicle is illustrated. The view illustrates a vehicle speed dependency characteristic (formula 16h) of the lateral slip angle $\beta$ at the point of center of gravity of the rear vehicle obtained by the steady circular turning and the vehicle speed dependency characteristic (formula (17h)) of a turning radius at the point of the center of gravity of the rear vehicle. In the drawing on the left side, a turning radius of the center of gravity of the rear vehicle moves from a point "$0_{v\theta}$" on the extension of the rear axle of the rear vehicle at the extremely low speed to a point "$0_{vup}$" at the time of increasing the vehicle speed. This change is acquired as experiment identification values expressed in the formula (16i) and the formula (17i) of a lateral slip coefficient $K_{\beta\theta}$ and a stability factor $K_{SF}$ in the view on a right side of the drawing. That is, this change means that a static turn radius $R_{r2}=1/P_{2r}$ of the previously mentioned formula (0) depends on the increase of the vehicle speed and is expressed as a dynamic change of the formula (17h) in a formula (20).

$$\delta = \frac{\rho_{2r}}{|\rho_{2r}|}\left(1 + K_{SF}v_2^2\right)\ell_1 / \left\{\left(\frac{1'}{\rho_{2r}}\right)^2 + \ell_2^2 - \ell_c^2\right\}^{1/2} \tag{20}$$

Then, an experiment identification value of the tire cornering coefficient of the front axle of the front vehicle is acquired by the formula (18), and an experiment identification value of the tire cornering coefficient of the rear axle of the front vehicle and the rear axle of the rear vehicle is acquired by the formula (19).

FIG. 9 illustrates sensor devices for detecting a change in vehicle weight, a change in position of center of gravity, and a change in axle weight. On a left side of the drawing, a plan view and a side view of the articulated vehicle are disposed. Within a frame on a right side of the drawing, an articulation device that articulates the front vehicle and the rear vehicle is illustrated. The articulation device is constituted of a Y-axis joint and a Z-axis joint. A longitudinal load, a lateral load and a vertical load between the front and rear vehicles are transmitted by the Y-axis joint portion, and a change in pitch angle between the front and rear vehicles is absorbed by the Y joint portion. A change in yaw angle (a change in azimuth angle) between the front and the rear vehicles is absorbed by the Z-axis joint portion. A load cell (a vertical load sensor) that detects a vertical load is provided to the Y-axis joint portion. An air pressure sensor is disposed at an air pipe portion of an air spring of each axle of the front vehicle and the rear vehicle. The load cell and the air pressure sensor detect a change in total vehicle weight brought about by a change in number of passengers and the like. An angle sensor that detects a change in an articulation angle is provided to the Z-axis joint portion as a standard equipment regardless of whether or not driving is autonomous driving.

FIG. 10 is detection flow of a change in total vehicle weight, a change in the position of the center of gravity and a change in axle weight that are advanced in collation with FIG. 9.

In step (1), before the articulation is performed, loads of front axles and rear axles of the front vehicle, a load of the Y-joint, and the load of the rear axle of the rear vehicle (Nf1, Nr1, Nf1, Nr2) are measured. In step (2), the position of the center of gravity of the front vehicle and the position of the center of gravity of the rear vehicle in an empty vehicle state are calculated by a formula (21) and a formula (22). It is desirable to record processing up to this stage as an inspection control item in a vehicle manufacturing step.

$$\ell_{f1v} = \ell_1 N_{f1}/\left(N_{f1} + N_{r1}\right) \tag{21}$$

$$\ell_{f2v} = \ell_{h2} N_{r2}/(N_{f2} + N_{r2}) \tag{22}$$

In step (3), various air spring loads ($\Delta$Nf1, $\Delta$Nr1, $\Delta$Nr2) of the respective axles and the joint load ($\Delta$Nf2) in an empty vehicle articulation state are grasped, and such loads are set as zero points.

In step (4), post-correction values of the respective axle air spring loads and the articulation joint load ($\Delta$Nf1w, $\Delta$Nf2w, $\Delta$Nr2w and $\Delta$Nf2w) in a passenger riding state are grasped. In step (5), passenger weights ($\Delta$Nr2w and $\Delta$Nf2w) of the rear vehicle and a resultant force point (lf2p) of theses loads are calculated by using a formula (23).

$$\ell_{f2p} = \ell_{h2}\Delta N_{r2w}/(\Delta N_{f2w} + \Delta N_{r2w}) \tag{23}$$

In step (6), passenger weights ($\Delta$Nr1w and $\Delta$Nf1w) of the front vehicle and a resultant force point (lf1p) of these loads are calculated by using a formula (24) and a formula (25).

$$\Delta W_1 + \Delta N_{f2w} = \Delta N_{f1w} + \Delta N_{r1w} \tag{24}$$

$$\ell_{f1p}\Delta W_1 + \ell_{h1}\Delta N_{f2W} = \ell_1\Delta N_{r1w} \tag{25}$$

$$\ell_{f1p} = \{\ell_1\Delta N_{r1w} - \ell_{h1}\Delta N_{f2W}\}/(\Delta N_{f1w} + \Delta N_{r1w} - \Delta N_{f2w}) \tag{26}$$

In step (7), a total vehicle weight (w1+$\Delta$W2) that is a sum of a vehicle weight of the rear vehicle and a weight of passengers, and a resultant point of center of gravity (lf2vp) of theses weights are calculated by using a formula (27) and a formula (28).

$$W_{2w} = W_2 + \Delta W_2 \tag{27}$$

$$\ell_{f2vp} = (\ell_{2v}W_2 + \ell_{2p}\Delta W_2)/(W_2 + \Delta W_2) \tag{28}$$

In step (8), a total vehicle weight (W1+$\Delta$W1) that is a sum of a vehicle weight of the front vehicle and a weight of passengers, and a resultant force point (lf1vp) of theses weights are calculated by using a formula (29) and a formula (30).

$$W_{1w} = W_1 + \Delta W_1 \tag{29}$$

$$\ell_{f1vp} = (\ell_{1v}W_1 + \ell_{1p}\Delta W_1)/(W_1 + \Delta W_1) \tag{30}$$

In step (9), the respective axle weights (Nf1w, Nr1w, Nr2w) in a passenger riding state are calculated by a formula (31), a formula (32) and a formula (33).

$$N_{f1} + \Delta N_{f1} + \Delta N_{f1w} = N_{f1w} \tag{31}$$

$$N_{r1} + \Delta N_{r1} + \Delta N_{r1w} = N_{r1w} \tag{32}$$

$$N_{r2} + \Delta N_{r2w} = N_{r2w} \tag{33}$$

The change in total vehicle weight, the change in position of the center of gravity and the change in axle load that are brought about by riding on or getting off of passengers that are obtained in the above-mentioned steps are reflected on data of the longitudinal motion model and the lateral motion model, and are used in an adaptive control of these changes.

FIG. 11 illustrates a traveling performance curve diagram and an acceleration control formula expressed in terms of acceleration. On an upper stage of the drawing, an engine torque diagram, a gear shift diagram and a traveling performance curve diagram are arranged in order from a left side to a right side, and on a lower stage of a right side of the drawing, a traveling performance curve diagram expressed in terms of acceleration is illustrated. Then, to observe FIG. 11 by shifting the viewing of the drawing from a right side to a left side on a lower stage of the drawing from the traveling performance curve diagram (34) expressed in terms of acceleration, a required acceleration formula (35) is expressed. An acceleration degree-of-opening formula (36) that conforms with require acceleration is arranged below the required acceleration formula (35). Further, a formula

(37) that calculates a passenger-riding-time vehicle mass based on the generated acceleration is arranged below the acceleration degree-of-opening formula (36).

An engine torque diagram exhibits a peak torque point ($n_p$), and an engine torque on a side lower than the peak point is used. The engine torque is subjected to gear shifting through an automated mechanical transmission (AMT) and is expressed as a traveling performance curve illustrated in the traveling performance curve diagram. In an example where four shift gear ratios are adopted as illustrated in the diagram, four mountains (drive forces) are indicated. A quadratic curve that is depicted by a dotted line in a state where the quadratic curve is in contact with the mountains becomes a hyperbolic curve. The driving force generated by the engine torque is consumed as a traveling resistance that is obtained by adding a gradient resistance to which gravitational acceleration generated by a slope gradient is multiplied to an inertial resistance expressed by a quadratic curve depending speed that is a sum of rolling resistance and air resistance. A drive force obtained by subtracting the traveling resistance from the hyperbolic curve becomes a surplus towing force.

In place of the drive force in the traveling performance curve diagram expressed as a drive force with respect to vehicle speed, in a case where the traveling performance curve diagram is expressed by acceleration and deceleration, the traveling performance curve diagram expressed by acceleration is obtained. On a flat test course, an acceleration test is performed with the degree of opening of acceleration set at a full value so that a generated acceleration curve indicated by a solid line in (2) is obtained. The gears are shifted to a neutral position from a high speed region, the acceleration is released and a deceleration speed is recorded thus obtaining a quadratic curve of inertial resistance degree of deceleration in (3), and the quadratic curve is added to the generated acceleration curve in (2) so that a formula of hyperbolic curve indicated by a dotted line in (1) is obtained.

$$y = \frac{a}{x} \quad (34)$$

In the formula (34), y indicates generated acceleration, x indicates a vehicle speed, and a indicates a hypobaric constant. This a is inversely proportional to a vehicle total weight brought about by a change of the number of passengers. Accordingly, by making the hyperbolic constant a and the degree-of-opening of acceleration correspond to each other, a change in vehicle weight can be detected. Assuming a case where an electric motor is used as an engine, a motor having an output that satisfies the hyperbolic constant a is used.

A formula (35) indicated on a left and lower side of the drawing is described.

$$y = \frac{a}{x} \times \frac{m_0}{m_L} \times Acc \% - D_r - D_a - D_\theta \quad (35)$$

On a left side, y indicates required acceleration (or generated acceleration). On a right side, a indicates a hyperbolic constant, x indicates a vehicle speed, $m_0$ indicates an empty vehicle mass, $m_L$ indicates a passenger mass, Acc % indicates a degree-of-opening of acceleration, $D_r$ indicates rolling resistance corresponding acceleration, Da indicates air resistance corresponding acceleration, and De indicates gradient resistance corresponding acceleration, a, me, $D_r$, $D_a$ are known obtained by experiments performed at the time of preparing "traveling performance curve diagram expressed in terms of acceleration". $m_L$ is known from FIG. 6 and FIG. 7 and hence, a road gradient Do, a vehicle speed x, acceleration y corresponding to the degree-of-opening of acceleration Acc % during current traveling can be calculated. The road gradient De can be acquired by FIG. 9 described later.

From the formula (35), a formula (36) of the degree-of-opening of acceleration with respect to required acceleration can be obtained. From this formula (36), at the road gradient De and the vehicle speed x during the current traveling, the degree-of-opening of the acceleration Acc % can be controlled by receiving the required acceleration y.

$$Acc \% = (y + D_r + D_a + D_\theta)\frac{x}{a} \cdot \frac{m_L}{m_0} \quad (36)$$

From the formula (35) and the formula (36), a formula (37) on passenger riding time vehicle mass $m_L$ can be obtained. By inputting a generated acceleration y that is detected by an acceleration meter mounted on the vehicle, a vehicle speed x, the degree-of-opening of acceleration, and a road gradient, the passenger riding time vehicle mass $m_L$ can be obtained, and the passenger riding time vehicle mass $m_L$ can be verified by collating the passenger riding time vehicle mass $m_L$ with a detection value obtained from FIG. 9 and FIG. 10. The autonomous driving is performed by controlling a quantity of state relative to the degree-of-opening of the acceleration Acc %.

$$m_L = m_0(y + D_r + D_a + D_\theta)^{-1}\frac{a}{x}Acc \% \quad (37)$$

FIG. 12 describes a method of estimating a road gradient. A read-out value ($G_{x(static)}$) of a gravity acceleration meter (a G meter) mounted on the vehicle is expressed by a formula (38) in a stationary state or in a constant speed state on a slope.

$$G_{x(Static)} = -9.81 \times \sin\theta \quad (38)$$

The read-out value ($G_{x(run)}$) during traveling is expressed by a formula (39) where a wheel acceleration component is superposed to the read-out value in a stationary state or in a constant speed state on a slope.

$$G_{x(run)} = G_{wheel} + G_{static} = 2\pi r\dot\omega - 9.81 \times \sin\theta \quad (39)$$

From the formula (38) and the formula (39), a slope gradient is expressed by a formula (40).

$$\theta = \sin^{-1}\frac{2\pi r\dot\omega - G_{x(run)}}{9.81} \quad (40)$$

FIG. 13 describes a method of performing a deceleration control. The deceleration method is established on a premise that the method uses an electronic control brake system (EBS) that generates deceleration that is proportional to a brake pedal stroke in conformity with a change in the number of passengers and a change in a road gradient. On a right side of the drawing, an example of generated deceleration (m/s²) with respect to a brake pedal stroke (%) is illustrated. A deceleration control formula is expressed by a formula (41).

$$B_{p\%} = D_{cc}(G_{EBS} \mp G_{\theta}) + B_{p0} \qquad (41)$$

In the formula, $B_{p\%}$ indicates a brake pedal stroke (%), $D_{cc}$ is a deceleration generation coefficient in flat ground verification experiment, $G_{req}$ indicates required deceleration, Ge indicates a gradient resistance, and $B_{p}0$ indicates a brake pedal play allowance.

In the play allowance, inertial deceleration described in FIG. 8 acts.

Autonomous driving is performed by controlling a quantity of state that corresponds to a brake pedal stroke.

FIG. 14 describes a vehicle (dynamic) model that functions by matching the GPS, the magnetic marker and inertia measurement. A longitudinal motion is illustrated in an upper portion of the drawing by a bold line, and a lateral motion is illustrated in a lower side of the drawing by a bold line. First, the longitudinal motion part is described. A road gradient (see FIG. 9) is estimated from a vehicle speed (wheel speed) and longitudinal acceleration ($G_x$), An own weight (FIG. 7, FIG. 8) is estimated from acceleration % and the vehicle speed. The acceleration % or the brake % corresponding to request acceleration/deceleration with respect to a scheduled vehicle speed is calculated, and a vehicle control is performed in conformity with the scheduled vehicle speed or a traveling situation. The vehicle motion is accompanied with a vehicle body lateral slip angle and hence, a difference is generated between a wheel speed (a longitudinal speed) and a vehicle speed (a combined speed of the longitudinal speed and a lateral speed) by a GPS that is not affected by a vehicle body lateral slip angle (longitudinal speed) Accordingly, the vehicle speed is divided by cosines of "a lateral slip angle obtained from a ratio between a lateral slip speed obtained by integrating lateral accelerations measured by the acceleration sensor mounted on the vehicle and a longitudinal slip speed obtained by integrating longitudinal accelerations" and "the vehicle body lateral slip angle obtained from the vehicle model", and the vehicle speed is collated with a GPS vehicle speed so as to correct an error.

Next, the lateral motion part is described. A curve formula that includes a target path coordinates based on a GPS and flows from a current position toward a target path is prepared, and a curvature of the curve formula is calculated. In parallel to such a calculation, a curvature of the path that reaches a target point that is detected by a visual sensor is also prepared and is held in a standby state. When the visual sensor detects an obstacle, a detected longitudinal distance and a detected lateral distance are assigned to an advancing path change formula where a longitudinal distance and a lateral distance for avoiding the obstacle are used as parameters thus calculating a curvature for changing the advancing path. A composite curvature is obtained by adding this calculated curvature, and the composite curvature is assigned to a formula of a steering wheel angle. At the same time, "a relative cant angle (ξ)" that is a sum of "lateral acceleration that is obtained based on the composite curvature and the vehicle speed" and a road cant that is detected by a wheel speed, lateral acceleration and a yaw rate" is assigned to the formula of the steering wheel angle. Axle weights that change by loading are assigned to the formula of steering wheel angle (20) so that a steering angle to be inputted to the vehicle or the vehicle model is calculated. The inputted steering is performed by a steering motor. In such an operation, a deviation between a zero point position of the steering motor and an actual vehicle handle neutral position is inputted to a vehicle controlled variable, a vehicle motion is generated in response to the reception of the vehicle controlled variable, and moving coordinates and its azimuth are outputted from the generated lateral slip angle (β) and the generated yaw angle (φ) by the GPS, the magnetic sensor and an IMU. In parallel to such an operation, a steered angle that is obtained by adding a steering hysteresis correction to the handle angle is inputted to a vehicle model expressed by a formula (16) and a formula (17), and calculated values of the moving coordinates and its azimuth are outputted based on the lateral slip angle (β) and the generated yaw angle (φ).

An actual vehicle is illustrated in a vertically elongated frame arranged at a center portion of the drawing, and a vehicle model is illustrated below the vertically elongated frame by a bold line. A lateral acceleration $G_{y\_imu}$, a longitudinal acceleration $G_{x\_imu}$ and a yaw rate $\gamma_{\_imu}$, are detected by an inertial measurement unit (IMU) mounted on the actual vehicle. An X coordinate $X_{\_GPS}$, a Y coordinate $Y_{\_GPS}$ and an azimuth angle $\lambda_{\_GPS}$ are detected from a GPS, and an X coordinate Xmk, a Y coordinate Ymk and an azimuth angle λmk are detected from a magnetic sensor. An IMU detection lateral slip angle $\beta_{imu}$ is detected from the $G_{y\_imu}$ and $G_{x\_imu}$, a lateral slip angle $\beta_{GPS}$ is detected from a vehicle speed $V_{GPS}$ that is detected by the GPS, and a longitudinal vehicle speed $V_{can}$ that is detected by a vehicle CAN. Three β of $\beta_{cal}$ that are calculated by the formula (16) on the vehicle model form a standby redundancy structure depending on a system diagnosis situation. From this β and the yaw rate $\gamma_{\_imu}$ detected by the Imu, an $X_{imu}$, a $Y_{imu}$ and an azimuth angle $\lambda_{imu}$ by the IMU are calculated and the X coordinate $X_{GPS}$, the Y coordinate $Y_{GPS}$ and the azimuth angle $\lambda_{GPS}$ detected by the GPS, and the X coordinate Xmk, a Y coordinate Ymk and the azimuth angle λmk that are detected from the magnetic sensor, and four factors, that is, the X coordinate Xcal, the Y coordinate Ycal, the azimuth angle λcal outputted from the vehicle model by calculation form a standby redundancy structure depending on a system diagnosis situation. By reflecting the own position (X, Y) outputted from the standby redundancy structure depending on the system diagnosis structure and the current position in the advancing direction (λ) on a target path coordinate that is a feed forward term, a curve formula that flows from the current position to the target path is prepared, and a steering angle is decided based on a curvature of the curve formula. Under an environment where the GPS cannot be used, the target path is determined by the visual sensor, and the steering angle is decided. It is possible to provide the redundancy system that functions by matching the GPS, the inertial measurement and the vehicle model.

As has been described above, the present invention includes the control method where, a path is set such that a trajectory of a rearmost axle forms the path irrespective of a single vehicle or articulated vehicle so as to allow the single vehicle or the articulated vehicle having different vehicle data and dimensions to trace the path, and the method includes a formula that calculates a steering angle from a path radius of curvature of the path, that is, a control formula that is formed of geometric dimensions where a wheelbase and an articulation point position are used as parameters and stability factors. Further, the method includes a check helm that traces the path while suppressing a change in an articulation angle that is generated by a pushing force (drive force) that is generated when ae rear vehicle pushes a front vehicle. The present invention realizes an autonomous drive articulated vehicle and a control method that are applicable to a bus rapid transit system that performs autonomous driving without relying on "driving by a man" on a road surface having no rails.

Further, "the control formula that includes the stability factor" is expressed by a formula that includes a total vehicle weight, a position of the center of gravity, an axle load and a tire cornering coefficient as variables, and a change in a total vehicle weight, a change in the position of the center of gravity, and a change in the axial weight are detected by the sensors that the vehicle includes, a tire cornering coefficient has an value identified by an experiment. Accordingly, the vehicle is adaptable to a change in the state of the own vehicle and a gradient of a road relating to an acceleration/deceleration control irrespective of an advancing control.

Accordingly, it is possible to realize an autonomous driving articulated vehicle and its control method that are applicable to a bus rapid transit system where a bus is autonomously driven without depending on "driving by a human" on a road surface having no rails.

The invention claimed is:

1. An autonomous driving method of an articulated vehicle where the articulated vehicle is formed of a front vehicle and a rear vehicle by way of an articulation mechanism, and the rear vehicle on which an engine is mounted pushes the front vehicle on which the engine is not mounted, wherein an articulation angle between the front vehicle and the rear vehicle of the articulated vehicle is calculated from a curvature of a target path such that a trajectory of a center point of a rearmost axle of the rear vehicle of the articulated vehicle traces a preset target path on which a single vehicle also traces, a difference between the calculated articulation angle and an actual articulation angle is converted into a steering angle, and a check helm that corresponds to the converted steering angle is applied to a steering shaft of the front vehicle.

* * * * *